(12) United States Patent
Kimura et al.

(10) Patent No.: US 10,502,955 B2
(45) Date of Patent: Dec. 10, 2019

(54) HEAD-UP DISPLAY DEVICE, NAVIGATION DEVICE, AND DISPLAY METHOD

(71) Applicant: ALPINE ELECTRONICS, INC., Tokyo (JP)

(72) Inventors: Tsuyoshi Kimura, Fukushima (JP); Takayuki Tabeta, Fukushima (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 15/996,959

(22) Filed: Jun. 4, 2018

(65) Prior Publication Data

US 2019/0049724 A1 Feb. 14, 2019

(30) Foreign Application Priority Data

Aug. 8, 2017 (JP) ................................ 2017-153648

(51) Int. Cl.
*G02B 27/01* (2006.01)
*G06K 9/00* (2006.01)
(Continued)

(52) U.S. Cl.
CPC ..... *G02B 27/0101* (2013.01); *G06K 9/00671* (2013.01); *G06K 9/00798* (2013.01);
(Continued)

(58) Field of Classification Search
CPC ........ G02B 27/0101; G02B 2027/0138; G02B 2027/014; G02B 2027/0141;
(Continued)

(56) References Cited

U.S. PATENT DOCUMENTS

2010/0164702 A1* 7/2010 Sasaki ................... G01B 21/22
340/438
2016/0170487 A1* 6/2016 Saisho ............... G01C 21/3635
345/156
(Continued)

FOREIGN PATENT DOCUMENTS

JP 2014-234139 12/2014
JP 2015-210644 11/2015

OTHER PUBLICATIONS

Continental Automotive Japan, "Driving with Augmented Reality Head-Up Display", Jan. 14, 2015 (retrieved Jul. 19, 2017 from a site "www.youtube.com/watch?v=zMdkgr2cw5U").
(Continued)

*Primary Examiner* — Cara E Rakowski
*Assistant Examiner* — Magda Cruz
(74) *Attorney, Agent, or Firm* — IPUSA, PLLC

(57) ABSTRACT

A head-up display device displays a virtual image in front of a vehicle, and includes a memory configured to store a program, and a processor. The processor is configured to execute the program and perform a process that includes acquiring information related to a target object recognized from image data received from an imaging device that captures a view in front of the vehicle, generating a projection image to be projected as the virtual image, determining a display position of the projection image along a traveling direction of the vehicle, based on the information related to the target object, using the target object as a reference, transforming the projection image into a support image viewed from a predetermined direction, and projecting the support image in front of the vehicle.

20 Claims, 18 Drawing Sheets

(51) Int. Cl.
*H04N 5/232* (2006.01)
*H04N 5/265* (2006.01)
*G06T 7/70* (2017.01)
*B60R 21/00* (2006.01)
*G08G 1/16* (2006.01)
*B60R 1/00* (2006.01)

(52) U.S. Cl.
CPC ..... *G06K 9/00805* (2013.01); *H04N 5/23293* (2013.01); *H04N 5/265* (2013.01); *B60K 2370/334* (2019.05); *B60R 1/00* (2013.01); *B60R 21/00* (2013.01); *B60R 2300/205* (2013.01); *B60R 2300/301* (2013.01); *B60R 2300/308* (2013.01); *B60R 2300/804* (2013.01); *B60R 2300/8093* (2013.01); *G02B 2027/014* (2013.01); *G02B 2027/0138* (2013.01); *G02B 2027/0141* (2013.01); *G06T 7/70* (2017.01); *G08G 1/16* (2013.01)

(58) Field of Classification Search
CPC ........... G06K 9/00671; G06K 9/00798; G06K 9/00805; G06K 9/00818; B60K 2370/334; B60R 1/00; B60R 21/00; B60R 2300/205; B60R 2300/301; B60R 2300/308; B60R 2300/804; B60R 2300/8093; G06T 7/70; G08G 1/16; H04N 5/23293; H04N 5/265
See application file for complete search history.

(56) References Cited

U.S. PATENT DOCUMENTS

| | | | |
|---|---|---|---|
| 2016/0327402 A1* | 11/2016 | Funabiki | G01C 21/365 |
| 2017/0039438 A1 | 2/2017 | Homma | |
| 2017/0336629 A1* | 11/2017 | Suzuki | B60K 35/00 |
| 2018/0011314 A1* | 1/2018 | Quiroz de la Mora | G02B 27/0101 |
| 2018/0148072 A1* | 5/2018 | Kamiya | G06K 9/0061 |
| 2018/0157036 A1* | 6/2018 | Choi | G02B 27/0101 |
| 2018/0306597 A1* | 10/2018 | Kosaka | B60K 35/00 |
| 2019/0018250 A1* | 1/2019 | Kasazumi | B60K 35/00 |

OTHER PUBLICATIONS

Junshiro Kanda et al., "A method to measure road white line by analyzing images accumulated from video camera which is mounted on the vehicle", Information Processing Society of Japan (IPSJ), Mar. 7, 2006.

* cited by examiner

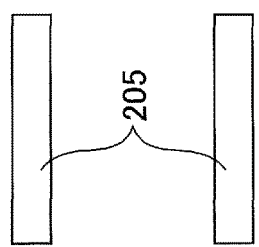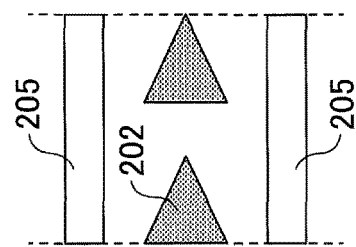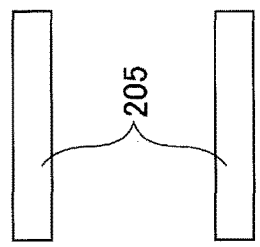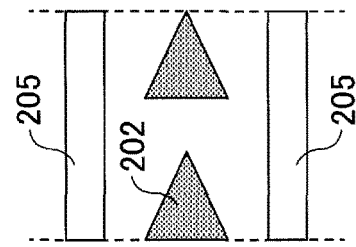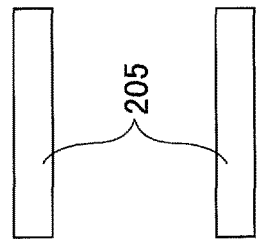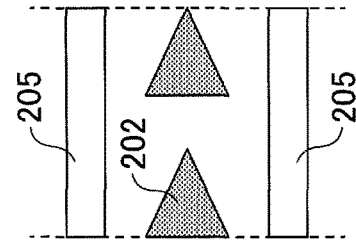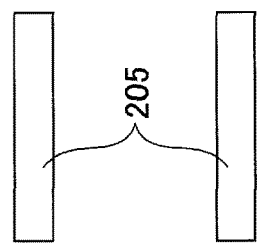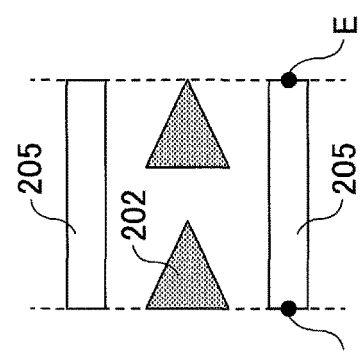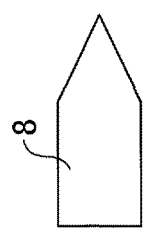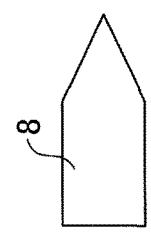
FIG.2A
FIG.2B

FIG.4B
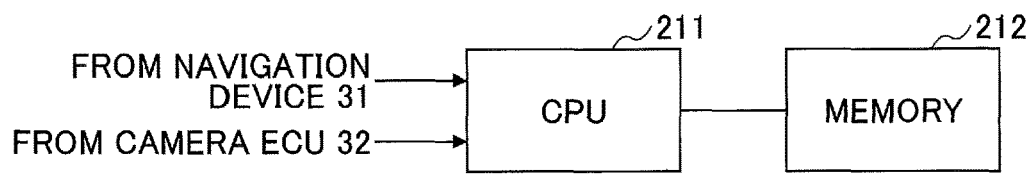
FIG.5
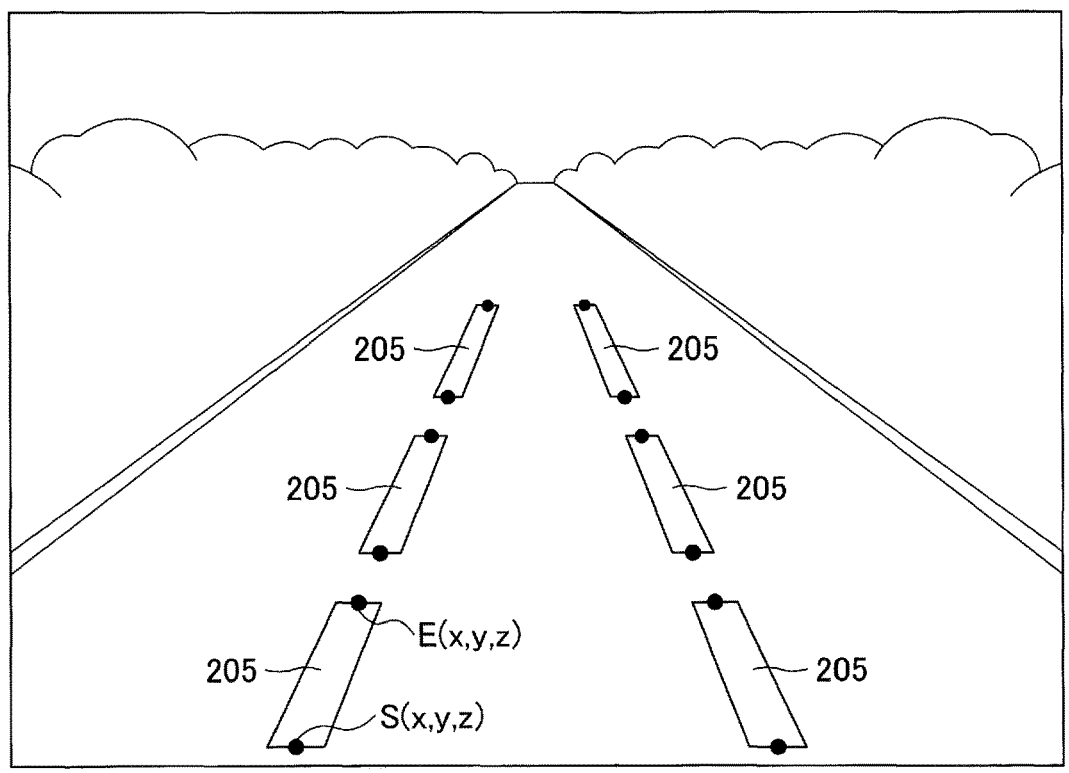
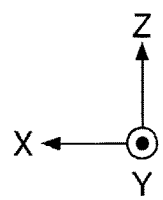

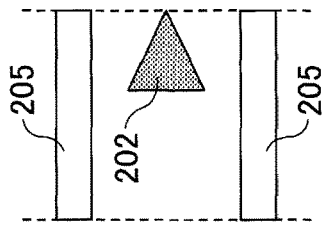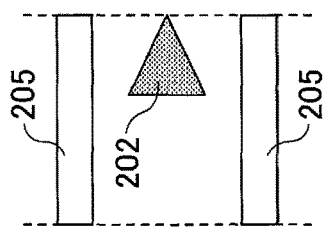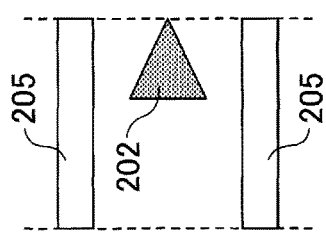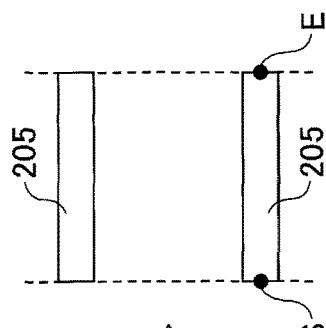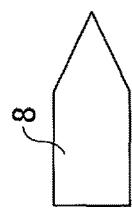
FIG.13A
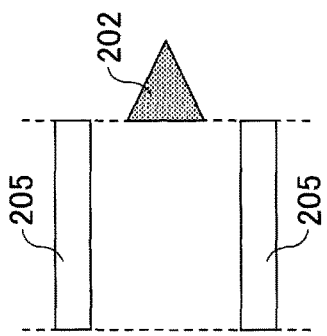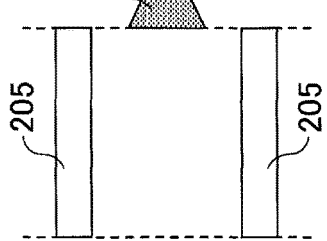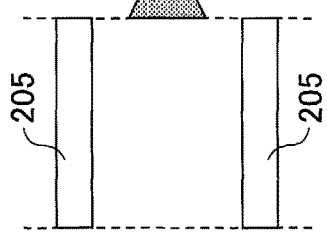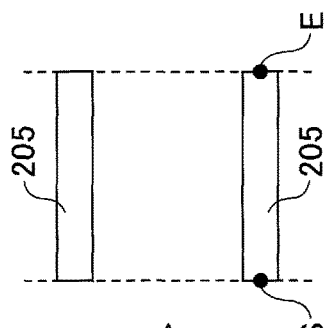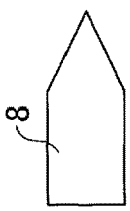
FIG.13B
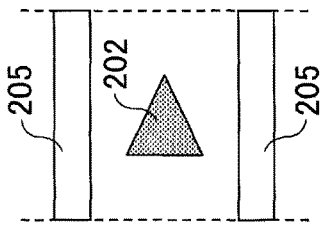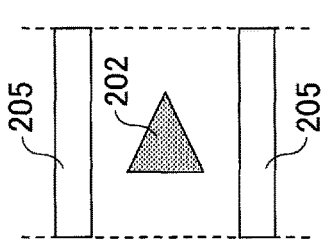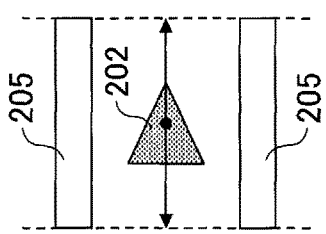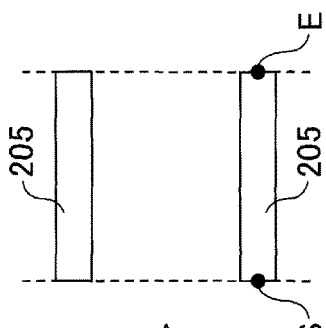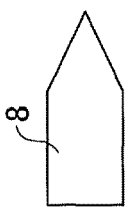
FIG.13C

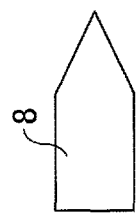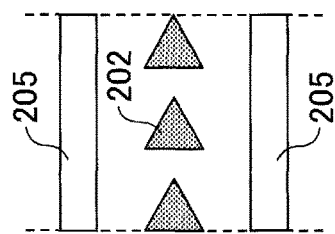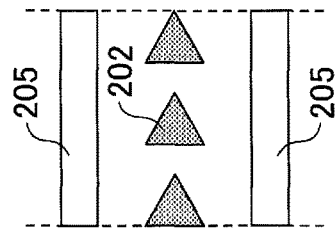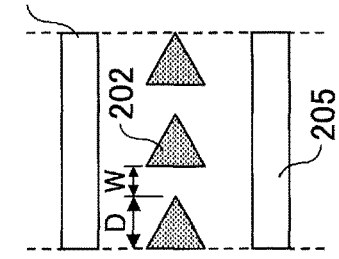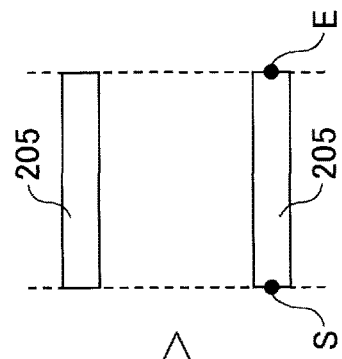
FIG.14A
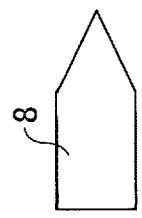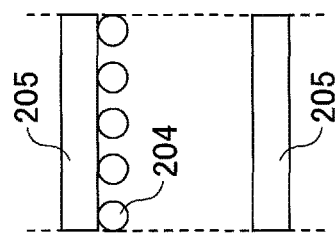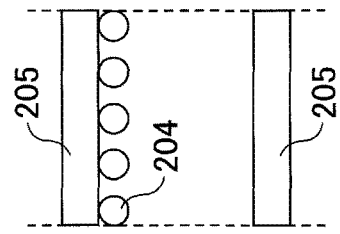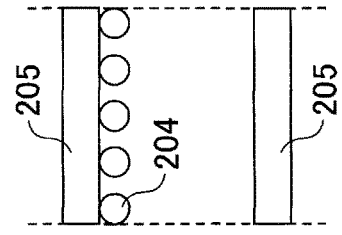
FIG.14B
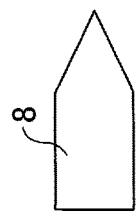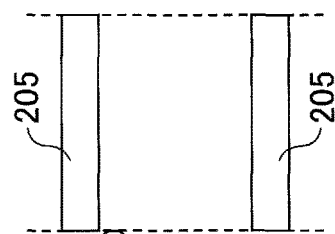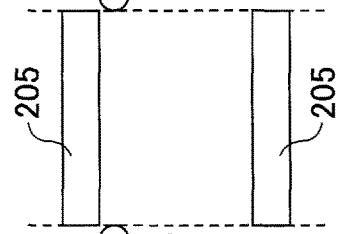
FIG.14C

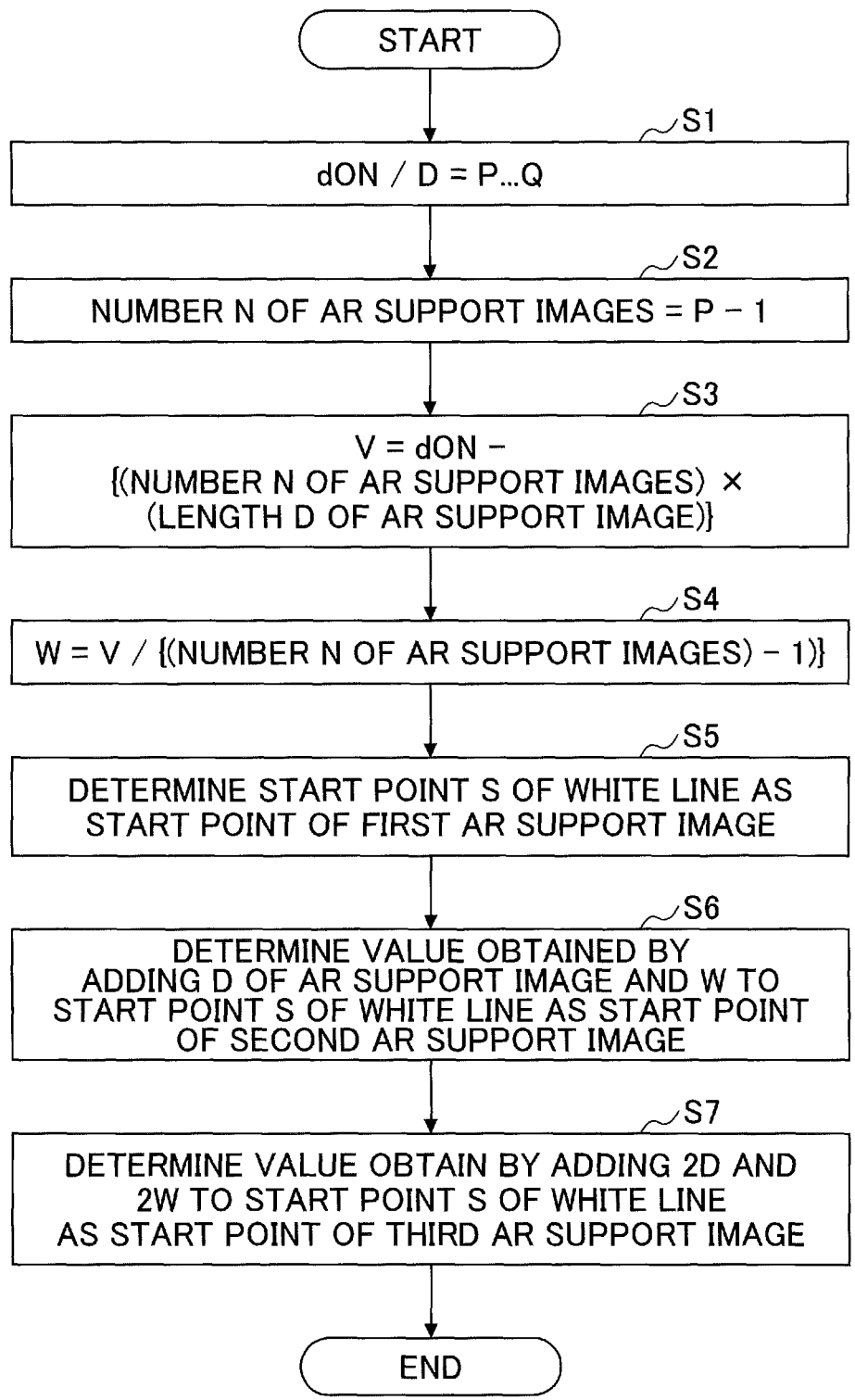

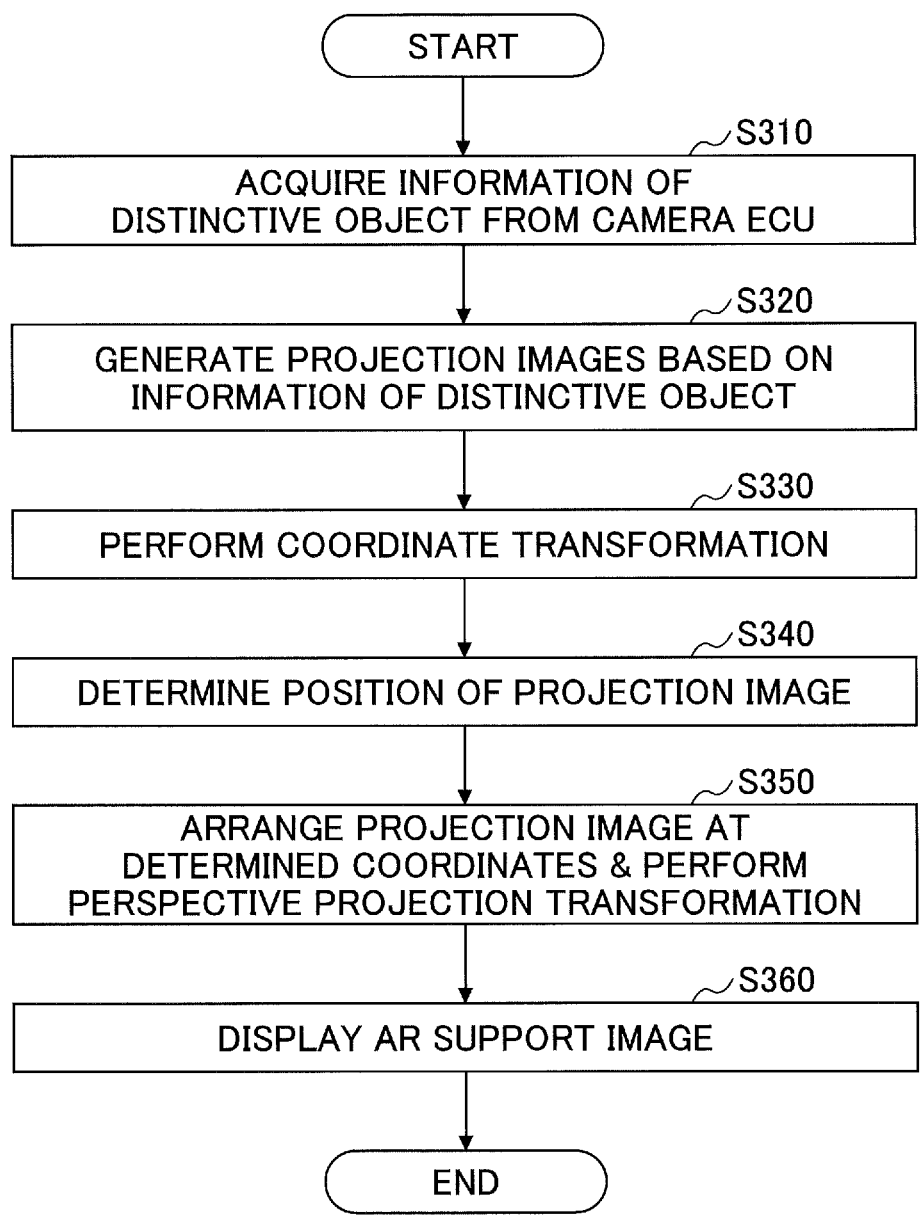

HEAD-UP DISPLAY DEVICE, NAVIGATION DEVICE, AND DISPLAY METHOD

CROSS-REFERENCE TO RELATED APPLICATIONS

This application is based upon and claims the benefit of priority of the prior Japanese Patent Application No. 2017-153648 filed on Aug. 8, 2017, the entire contents of which are incorporated herein by reference.

BACKGROUND OF THE INVENTION

1. Field of the Invention

The present invention relates to a head-up display device, a navigation device, a display method, and a computer-readable storage medium. The head-up display device may sometimes also be referred to as a heads-up display device, or a HUD device.

2. Description of the Related Art

A technique called AR (Augmented Reality) superimposes an image displayed by the head-up display device on an actual view in front of a vehicle, for example, to simultaneously provide the actual view and information that supports driving of the vehicle. A driver of the vehicle can identify the information simultaneously displayed and superimposed on the view of a situation in front of the vehicle, while observing the situation in front of the vehicle. The driver can identify the information with a smaller eye movement compared to a case in which the driver views a display provided inside the vehicle.

For example, Japanese Laid-Open Patent Publication No. 2015-210644 proposes a first technique that emphasizes structures on a road by utilizing the AR. This first technique is used in a display system of the vehicle, and white (or warning) lines on the road are detected and superimposed on the actual view, to display a wall image of the while lines.

On the other hand, Continental Automotive Japan, "Driving with Augmented Reality Head-Up Display", Jan. 14, 2015 (retrieved Jul. 19, 2017 from a site "www.youtube.com/watch?v=zMdkgr2cw5U") proposes a second technique that updates the image superimposed on the actual view according to a velocity of the vehicle, as described below in conjunction with FIG. 1A and FIG. 1B.

FIG. 1A and FIG. 1B are diagrams for explaining examples of AR images that are displayed by updating the image superimposed on the actual view according to the velocity of the vehicle, according to the second technique. FIG. 1A illustrates an image in which a guide line 201 is generated, one after another, according to the velocity of the vehicle traveling on a traffic lane on the road. The guide line 201 is formed by triangular icons 202 that are displayed, one after another. Each triangular icon 202 may be referred to as an AR support image. If the AR support image is not updated even the vehicle is moving, the AR support image remains still in front of the vehicle even though the actual view moves and flows towards a rear of the vehicle. Hence, the second technique displays the guide line 201 so that the triangular icons 202 move faster towards the rear of the vehicle as the velocity of the vehicle becomes higher. As a result, the triangular icons 202 are displayed so as to move towards the rear of the vehicle and reduce unnatural feeling perceived by the driver with respect to the flow of the actual view.

FIG. 1B illustrates an AR support image that warns a deviation from the lane, superimposed on the actual view. In the example illustrated in FIG. 1B, the AR support image of circular icons 204 forming a warning line 203 is displayed to be superimposed on left whites line 205 in the actual view in front of the vehicle. In this case, the second technique also displays the warning line 203 so that the circular icons 204 move faster towards the rear of the vehicle as the velocity of the vehicle becomes higher.

However, the second technique simply changes the display speed of the AR support image according to the velocity of the vehicle. Consequently, it is not possible to display the AR support images according to the structures in the actual view. In other words, in the case of the white lines, for example, the white lines are formed at approximately the same intervals on the road surface, however, the second technique displays the AR support images regardless of the intervals (or pitch) of the white lines. For this reason, the driver may find the superimposed image of the actual view and the AR support images difficult to comprehend. In addition, the superimposed image of the actual view and the AR support images may cause the driver to experience VR sickness, which is a kind of motion sickness (or car sickness), due to differences between the actual view and the image viewed or sensed by the driver. In other words, when the driver visually recognizes the AR support images together with the structures on the road, such as the white lines, that are in a visual range of the driver, but the AR support images and the structures on the road have misaligned positional relationships, different flow rates, or non-synchronized flows, which may cause the driver to experience the VR sickness.

An example of a method of measuring the white lines on the road surface is proposed in Junshiro Kanda et al., "A method to measure road white line by analyzing images accumulated from video camera which is mounted on the vehicle", Information Processing Society of Japan (IPSJ), Mar. 7, 2006, for example.

SUMMARY OF THE INVENTION

Accordingly, it is an object in one aspect of the embodiments to provide a head-up display device, a navigation device, a display method, and a computer-readable storage medium, which can display an image according to structures in an actual view.

According to one aspect of the embodiments, a head-up display device that displays a virtual image in front of a vehicle, includes a memory configured to store a program, and a processor configured to execute the program and perform a process including acquiring information related to a target object recognized from image data received from an imaging device that captures a view in front of the vehicle, generating a projection image to be projected as the virtual image, determining a display position of the projection image along a traveling direction of the vehicle, based on the information related to the target object, using the target object as a reference, transforming the projection image into a support image viewed from a predetermined direction, and projecting the support image in front of the vehicle.

Other objects and further features of the present invention will be apparent from the following detailed description when read in conjunction with the accompanying drawings.

BRIEF DESCRIPTION OF THE DRAWINGS

FIG. 2A and FIG. 2B are diagrams for explaining examples of AR support images displayed by a head-up display device in a first embodiment;

FIG. 4B is a block diagram illustrating a hardware configuration of the image projection device;

FIG. 5 is a diagram illustrating an example of white line coordinates acquired by the head-up display device;

FIG. 13A, FIG. 13B, and FIG. 13C are diagrams for explaining other display examples using structures appearing at constant intervals;

FIG. 14A, FIG. 14B, and FIG. 14C are diagrams illustrating display examples for a case in which a plurality of AR support images are displayed with respect to one white line;

FIG. 15 is a flow chart illustrating an example of a procedure in which the image projection device displays a plurality of AR support images with respect to one white line;

FIG. 19 is a flow chart for explaining an example of an operation procedure of the head-up display device when the head-up display device displays the AR support image.

DESCRIPTION OF THE PREFERRED EMBODIMENTS

Figure 1A:
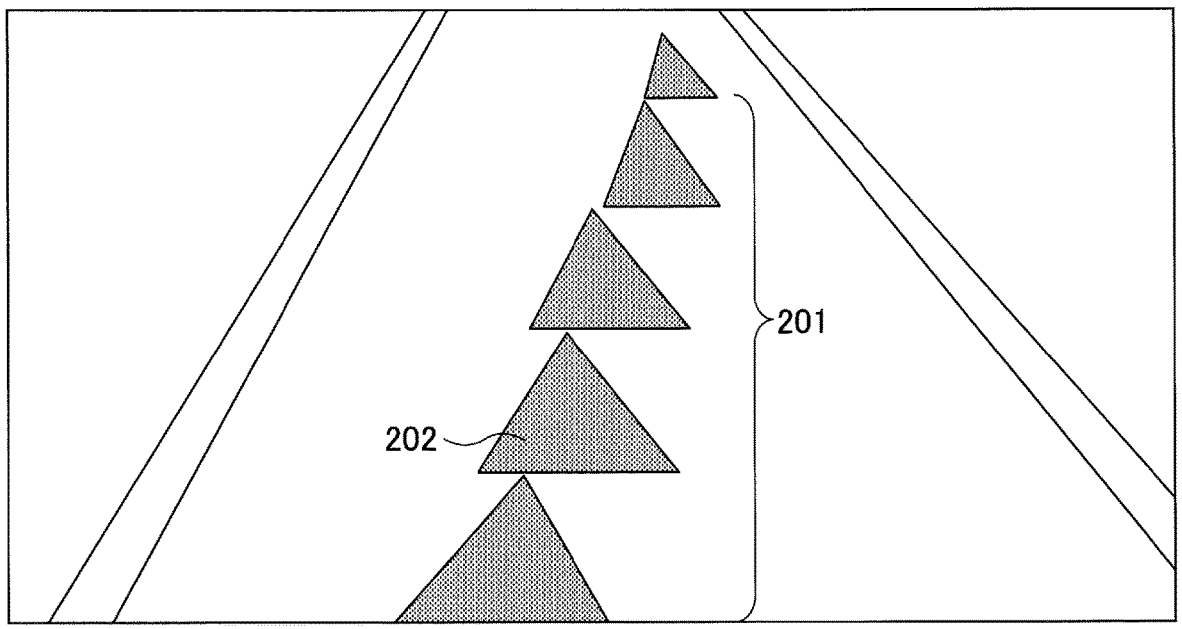
FIG. 1A and FIG. 1B are diagrams for explaining examples of AR images that are displayed by updating the images superimposed on the actual view according to the velocity of the vehicle, according to the second technique.
Figure 1B:
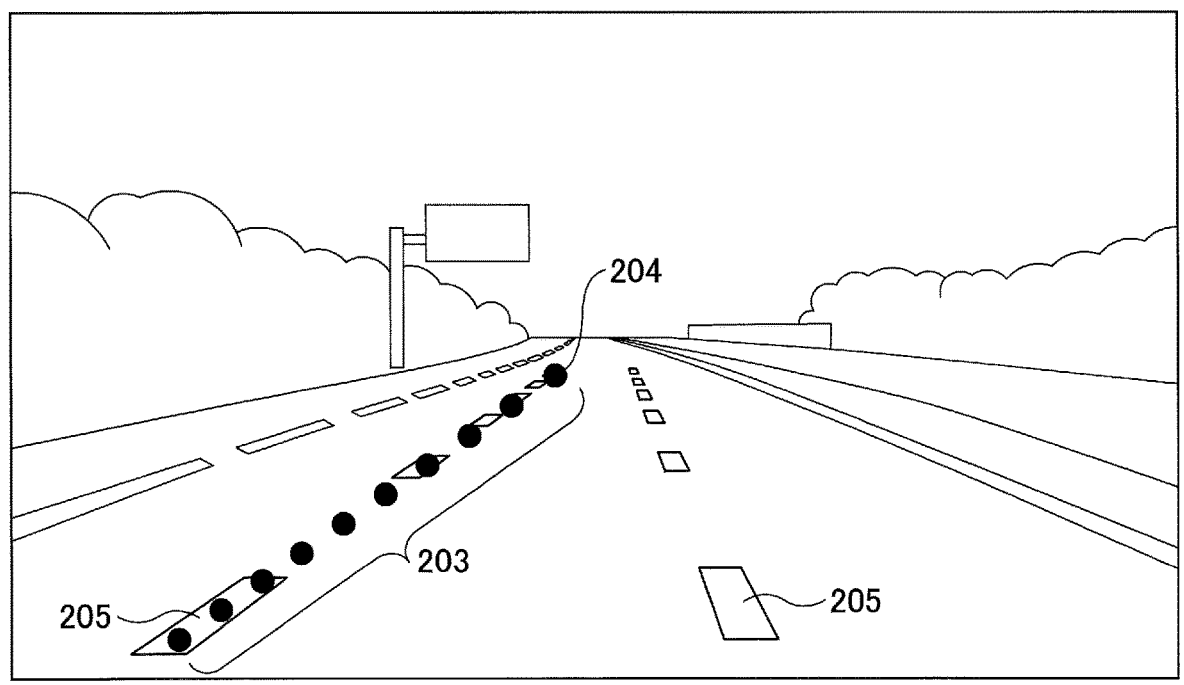

Embodiments of a head-up display device, a navigation device, a display method, and a computer-readable storage medium will be described with reference to FIG. 2A through FIG. 19.

First Embodiment

<Display Examples of AR Support Images>
FIG. 2A and FIG. 2B are diagrams for explaining examples of AR support images displayed by a head-up display device in a first embodiment. FIG. 2A is a plan view illustrating white lines 205 dividing traffic lanes, and FIG. 2B is a plan view illustrating AR support images of triangular icons 202 that are displayed at a center along a road-width direction between the right and left white lines 205. The AR support images of the triangular icons 202 are projected by the head-up display device, and are not formed on the actual road surface. FIG. 2B is a diagram for explaining how the AR support images displayed by the head-up display device appear when viewed by a driver.

As illustrated in FIG. 2B, the head-up display device displays the AR support images of the triangular ions 202 according to intervals (or pitch) of structures that appear repeatedly. For example, in FIG. 2B, the triangular icons 202 are displayed according to a start point S of the white line 205. In addition, the triangular icons 202 are displayed so that an end (or termination) point of one triangular icon 202 matches an end (or termination) point E of the white line 205. In other words, the white lines 205 are used as references that determine display positions of the AR support images along a traveling direction of a vehicle 8.

According to the AR support images described above, it appears to the driver as if the AR support images appear at the same intervals as the white lines 205. In addition, by displaying the AR support images according to the structures, the AR support images move towards the rear of the vehicle 8 at the same speed as the white lines 205 as the vehicle 8 travels. Accordingly, it is possible to increase a sense of unity between the actual view and the AR support image, and display images that are easy for the driver to comprehend. In addition, it is possible to reduce the possibility of the driver experiencing VR sickness.

<Terminologies>
The white lines include road outer lines located on the right and left edges of the road, and lane boundary lines dividing traffic lanes when a plurality of traffic lanes are provided on one side of the road. The road outer lines are continuous lines. On the other hand, the lane boundary lines are broken lines that are repeatedly formed on the road surface at constant intervals. In this embodiment, a case in which the white lines are the lane boundary lines will be described as an example. Of course, the white lines are not limited to lines that are painted in white on the road surface, and may be painted in other colors, such as yellow. In addition, the white lines do not necessarily have to form a perfect plane. For example, the white lines may be formed by raised markers such as bots-dots, or reflectors such as cat's eyes.

In this specification and claims, target objects may be any tangible objects that are identifiable from the image data. For example, the tangible objects include structures, distinctive features, planimetric features, laying objects, natural objects, moving objects, people, animals, or the like. In this embodiment, the target objects are tangible objects that are used as the references that determine the display positions of the AR support images.

Information related to the target objects include information indicating the types of the target objects and the locations of the target objects. Alternatively, the information related to the target objects include information of the target objects required to determine contents and the display positions of the AR support images.

The traveling direction of the vehicle 8 and a traveling direction of the display positions are directions taken along the road. These traveling directions may be regarded as directions parallel to curbstones, the white lines, or the like.

<Example of Configuration of Head-Up Display Device>

Figure 3:
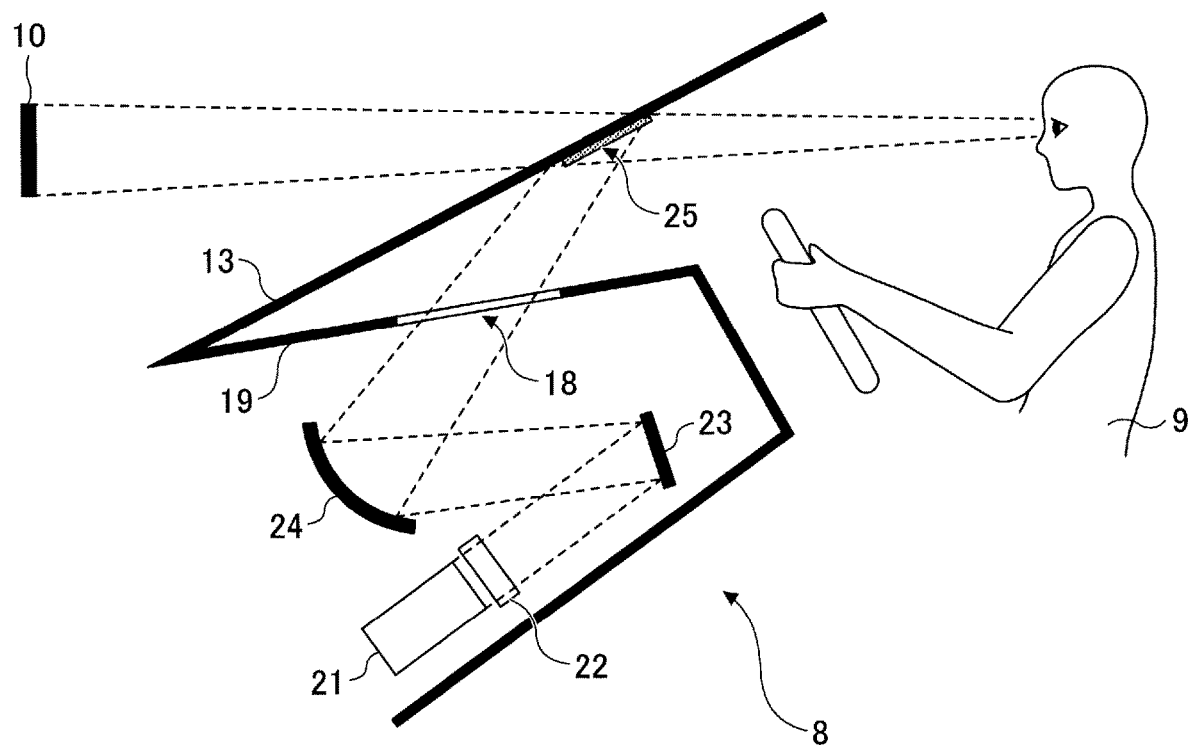
FIG. 3 is a diagram illustrating an example of a configuration of the head-up display device.

FIG. 3 is a diagram illustrating an example of a configuration of a head-up display device 100. The head-up display device 100 includes an image projection device 21, a diffuser 22, a reflection mirror 23, a concave mirror 24, and a combiner 25. Parts or components other than the combiner 25 are embedded within an instrument panel (or dashboard) 19 of the vehicle 8. An image reflected by the concave mirror 24 passes through an exit window 18, and is projected towards the combiner 25 that is formed on a windshield 13, as a projection image. The projection image is displayed as a virtual image 10 in front of the windshield 13. A driver 9 of the vehicle 8 can visually recognize the virtual image 10. Accordingly, the head-up display device 100 forms one embodiment of a display device. The driver 9 can identify the information that supports driving while maintaining the driver's line of sight to vehicles ahead, the road surface, or the like, or by only making a slight change in the driver's line of sight.

The image projection device 21 generates the image to be projected as the virtual image 10, based on the information that supports the driving and is acquired from an on-board device of the vehicle 8. More particularly, the image projection device 21 generates the AR support images that appear as if marks indicating the traveling direction, for example, are displayed on the road surface. In this case, the image projection device 21 arranges some kind of projection images, that are called "objects" in computer graphics, in a three-dimensional coordinate system, and generates the AR support images by a perspective projection transformation of the projection images onto a projection plane corresponding to the driver's line of sight. Alternatively, the image projection device 21 may simply generate information, such as a velocity of the vehicle 8, instead of generating the AR support images.

In addition, the image projection device 21 has an image projecting function to project the images. Methods of projecting the images include methods that use a LCD (Liquid Crystal Display), a DLP (Digital Light Processing), a laser projector, of the like. The method of projecting the images in this embodiment is not limited to a particular method of projection.

The diffuser 22 has a function to enlarge the image (or light) projected by the image projection device 21. Microlenses are formed without gaps on a surface of the diffuser 22 facing the image projection device 21. The microlenses can reduce an object distance compared to general lenses, and can more easily increase the L1 distance (or Manhattan distance). An angle of view or a visual range of the image may be determined by a size of the microlenses, a focal distance of each lens, or the like.

The reflection mirror 23 is arranged on a rear surface of the diffuser 22 when viewed from the image projection device 21 along a projecting direction of the image. The reflection mirror 23 reflects the image projected by the image projection device 21 towards the concave mirror 24. The image projection device 21 may project the image directly to the concave mirror 24. However, a distance from the combiner 25 to the virtual image 10 becomes longer as a distance from the image projection device 21 to the concave mirror 24 becomes longer, to enable the driver 9 to visually recognize the virtual image 10 by making a smaller change in the driver's line of sight. Accordingly, the number of reflection mirrors 23 that may be provided is not limited to one, and three or more reflection mirrors 23 may be provided in order to increase the distance from the image projection device 21 to the concave mirror 24 by folding back an optical path by the three or more reflection mirrors 23.

The concave mirror 24 functions as a lens for magnifying the image and reflecting the magnified image towards the combiner 25, and for imaging the virtual image 10. The image reflected by the concave mirror 24 passes through the exit window 18 in front of the instrument panel 18, and reaches the combiner 25. The size, angle, and position of the concave mirror 24 are designed so that the entire image reaches the combiner 25.

The combiner 25 has two functions. One function (function of a reflecting member) of the combiner 25 reflects the image reflected by the concave mirror 24 towards the driver 9. Another function (transmitting function) of the combiner 25 secures the visual range of the driver 9 obtained through the combiner 25. A beam splitter is formed on a first surface of the combiner 25 facing the driver 9, so that at least a part of the incoming image is reflected towards the driver 9. In addition, at least a part of external light is transmitted through the combiner 25 and reaches the eyes of the driver 9. Hence, the driver 9 can simultaneously see both the virtual image 10 and the actual view in front of the vehicle 8.

A second surface of the combiner 25 on the outside facing outside the vehicle 8 has a radius of curvature that is approximately the same as a radius of curvature of the first surface of the combiner 25 facing the inside of the vehicle 8 (that is, facing the driver 9). For this reason, the combiner 25 does not exhibit a lens effect with respect to the light transmitted through the combiner 25, and the actual view through the combiner 25 will not appear distorted to the driver 9.

<Functions of Image Projection Device>

Figure 4A:
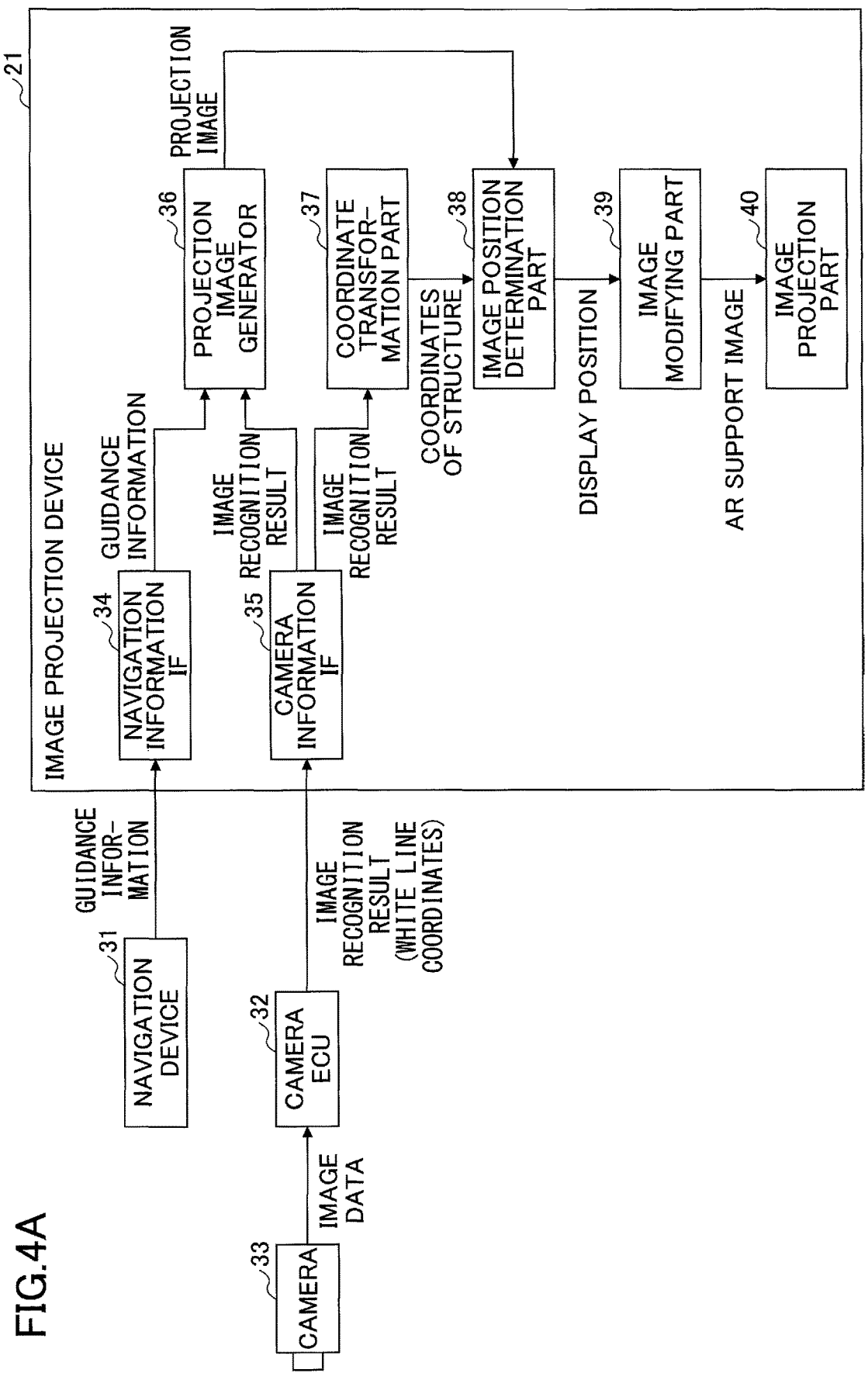
FIG. 4A is a block diagram illustrating a functional configuration of an image projection device.

FIG. 4A is a block diagram illustrating a functional configuration of the image projection device 21. A camera ECU (Electronic Control Unit) 32 and a navigation device 31 are connected to the image projection device 21 illustrated in FIG. 21. The camera ECU 32 is an example of a processor that controls a camera 33 that captures a view in front of the vehicle 8. The camera 33 is an imaging device capable of capturing still images or dynamic images. For example, the camera 33 is arranged at a position capable of capturing the white lines in front of the vehicle 8, such as a front side, facing the front of the vehicle 8, of an inside rearview mirror, a front part of a ceiling of the vehicle 8, a central part of a front bumper, a right or left corner part of the front bumper, or the like.

The camera 33 may be a monocular camera or a stereo camera. This embodiment has a function to detect coordinates of the white lines on the road surface, but this function may be achieved using the monocular camera. However, when the stereo camera (or the monocular camera capable of acquiring distance information) is used, it is possible to obtain the distance information in a capturing range regardless of the road surface. The camera 33 repeatedly captures the capturing range in front of the vehicle 8 at a predetermined period.

The camera ECU 32 performs various kinds of image processings on the image data captured by the camera 33. For example, the image processings may include a process to identify the white lines, a process to identify road signs, a process to identify a state of traffic lights, a process to detect objects (pedestrians, vehicles ahead, or the like), or the like. This embodiment mainly identifies structures that repeatedly appear at constant intervals. More particularly, this embodiment identifies the structures such as the white lines, guardrails (or crash barriers), distance marks (or mile markers), or the like. The camera ECU 32 detects the structures in a camera coordinate system.

The camera ECU 32 that identifies traffic control signs or the like performs a pattern recognition. The pattern recognition processes information to determine whether a pattern of a feature value matches that of one of a plurality of predetermined classes of patterns. The pattern recognition may use neural networks, deep learning, or algorithms such as support vector machines, and may learn in advance the features of the target objects and objects other than the target objects. The feature value may be appropriately set as an index that represents the features of the target object. For example, the features may be represented by HOG (Histograms of Oriented Gradients), SURF (Speed-Upped Robust Features), LBP (Local Binary Patterns), color histograms, or the like.

The navigation device 31 may provide various kinds of driver support. For example, the navigation device 31 detects the position of the vehicle 8 by GNSS (Global Navigation Satellite System) or the like, and displays the position of the vehicle 8 on a road map. In addition, the navigation device 31 may display a route to a destination on the road map, and provide guidance on the traveling direction prior to changing the route, in order to guide the driver 9 to the destination. In a case in which a plurality of lanes (traffic lanes) are provided on one side of the road, the navigation device 31 may provide guidance to the driver 9 regarding an appropriate lane to select, such as a right-turn-only lane, a left-turn-only lane, or the like. The head-up display device 100 generates and displays the AR support images based on guidance information from the navigation device 31.

The navigation device 31 illustrated in FIG. 4A is a component separate from the head-up display device 100. However, the navigation device 31 may include the head-up display device 100 or the functions of the head-up display device 100. Alternatively, the head-up display device 100 may include the navigation device 31 or the functions of the navigation device 31.

The image projection device 21 has functions of an information processing device, in addition to the function to project the image. The image projection device 21 has various functional blocks, including a navigation information IF (Interface) 34, a camera information IF (Interface) 35, a projection image generator 36, a coordinate transformation part 37, an image position determination part 38, an image modifying part 39, and an image projection part 40.

The camera information IF 35 acquires a recognition result of the image (hereinafter also referred to as "an image recognition result") from the camera ECU 32. In this embodiment, for example, the camera information IF 35 acquires the coordinates of the structure (white line coordinates). The navigation information IF 34 acquires guidance information from the navigation device 31. In this embodiment, for example, the navigation information IF 34 acquires the guidance information such as lane guide information, traveling direction information, or the like. The lane guide information provides guidance on a recommended lane on which the vehicle 8 is to travel. The camera information IF 35 and the navigation information IF 34 may communicate via an on-board network, such as a CAN (Controller Area Network).

The projection image generator 36 generates the projection image based on an image recognition result acquired by the camera information IF 35, or based on the guidance information acquired by the navigation information IF 34. For example, in a case in which the guide information that is acquired by the navigation information IF 34 provides a guidance to change a driving lane on which the vehicle 8 is traveling, the projection image generator 36 generates the projection image that guides the driver 9 to change from the currently driving lane to a next driving lane. The projection image may be the triangular icons 202 or arrow icons pointing up when guiding the driver 9 to drive directly ahead (or straight), the triangular icons 202 or arrow icons pointing right when guiding the driver 9 to change to the lane on the right, the triangular icons 202 or arrow icons pointing left when guiding the driver 9 to change to the lane on the left, or the like. In a case in which the image recognition result acquired by the camera information IF 35 is a lane departure warning, the projection image generator 36 generates the projection image that emphasizes the white lines on the road. The projection image is modified into the AR support image. The projection image and the AR support image are essentially the same image, and the projection image and the AR support image may not be clearly distinguished when describing this embodiment, unless necessary.

In the example described above, the projection image generator 36 generates the projection image based on the image captured by the camera 33. However, the projection image generator 36 may generate the projection image based further on an additional output from a sensor such as a radar sensor or a sonic sensor that detects surrounding obstacles of the vehicle 8, a rearview camera that detects the rear of the vehicle 8, or the like.

In a case in which a correspondence of the projection image and the image recognition result or the guidance information is determined in advance, the projection image generator 36 may determine the projection image corresponding to the image recognition result or the guidance information. On the other hand, in a case in which the image recognition result represents contents of the road sign or the like, the projection image generator 36 successively generates the projection image including the contents of the road sign or the like. For example, in a case in which the camera information IF 35 acquires a speed limit recognized from the road sign, the projection image generator 36 may generate the projection image imitating the road sign.

The coordinate transformation part 37 transforms the coordinates of the structure in the camera coordinate system into the coordinates in a vehicle coordinate system. The camera coordinate system has its origin at a center of the imaging device (or camera lens) of the camera 33. The vehicle coordinate system has its origin at a center (or center of gravity) of the vehicle 8, for example. The image projection device 21 projects the image in the vehicle coordinate system. Of course, the coordinates of the structure in the camera coordinate system may be transformed into coordinates of a suitable coordinate system other than the vehicle coordinate system, suited for the image projection device 21.

The image position determination part 38 determines the position where the projection image is to be arranged in the traveling direction of the vehicle 8 using, as references, the structures (white lines, guardrails, distance marking plates, or the like) that repeatedly appear at constant intervals. With regard to the road-width direction (or right and left direction), the position where the projection image is to be arranged is determined as directly in front, center of the white lines, near the structure, or the like. In addition, with regard to a height direction, the projection image in this embodiment is arranged on the road surface.

The image modifying part 39 generates the AR support image by subjecting the projection image arranged on the road surface to a perspective projection transformation. The projection image arranged on the road surface is aligned to the start point and the end point of the structure. Because the AR support image is modified as if the AR support image were formed (or painted) on the road surface when viewed from the driver 9, the driver 9 can visually recognize the AR support image such that unnatural feeling perceived by the driver 9 with respect to the flow of the actual view is reduced.

The image projection part 40 projects the AR support image generated by the image modifying part 39 using the image projecting function. More particularly, the image projection part 40 is an engine part that uses the LCD, DLP, laser projector, or the like.

FIG. 4B is a block diagram illustrating a hardware configuration of the image projection device 21. The image projection device 21 illustrated in FIG. 4B includes a CPU (Central Processing Unit) 211 and a memory 212. The CPU 211 is an example of a processor that executes one or more programs stored in the memory 212, to perform the process of the image projection device 21 illustrated in FIG. 4A. In other words, the CPU 212 can perform the functions of the navigation information IF 34, the camera information IF 35, the projection image generator 36, the coordinate transformation part 37, the image position determination part 38, the image modifying part 39, and the image projection part 40. The memory 212 stores the one or more programs executed by the CPU 211, and various data including intermediate results of computations performed by the CPU 211.

The memory 212 may be included in the image projection device 21. Alternatively, the memory 212 may be a component separate from the image projection device 21, and externally connected to the image projection device 21.

The memory 212 may be formed by a semiconductor memory device, or a storage device such as a magnetic disk drive, an optical disk drive, and a magneto-optical disk drive. The memory 212 is an example of a storage or anon-volatile computer-readable storage medium in one embodiment.

<Recognition of White Lines>

Various image processing techniques have been proposed with respect to white line recognition. For this reason, only one example of the white line recognition will be described hereunder. The camera ECU 32 detects coordinates of a boundary between the white lines and the road.

1. Edge Detection:

The camera ECU 32 detects the edge by performing an edge detection on each frame of the image data captured by the camera 33. The edge detection may use a filter suited for the edge detection, such as a Sobel filter, a Laplacian filter, a Canny filter, or the like. The edge detection may detect two patterns of edges, namely, an edge where the brightness changes from dark to bright (from road surface to white line), and an edge where the brightness changes from bright to dark (from white line to road surface).

2. Line Segment Extraction:

Next, a lower part of the image data, where the white lines may have been captured, is segmented into horizontal blocks, and line segments are extracted from edge points on each of the horizontal block. A Hough transform may be used to extract the line segment.

3. Grouping:

The line segments that may be regarded as having the same inclination (or slope) within the horizontal block are grouped into a group of line segments forming a part of the white line. In addition, one line segment and another line segment existing on an extension of the one line segment are grouped into the same group, by focusing on the start point and the end point of the line segments.

4. White Line Detection:

The line segments having the same inclination between the horizontal blocks are detected as a single white line candidate. In this case, the line segments within the group, one having the end point separated from the start point of the other by a distance greater than or equal to a threshold value, are not detected as belonging to the same white line candidate. A combination of the white line candidates that satisfies the following conditions (i), (ii), and (iii) is detected as the white line.

(i) The white line candidate having the edge where the brightness changes from dark to bright, and the white line candidate having the edge where the brightness changes from bright to dark have widths less than or equal to a threshold value of the width that may be regarded as the white line;

(ii) One white line candidate has a length greater than or equal to a length that may be regarded as the white line; and (iii) The position of the white line does not greatly change in a case in which the white line candidates of the current frame are compared to the white line candidates of several frames before the current frame.

<White Line Coordinates>

FIG. 5 is a diagram illustrating an example of white line coordinates acquired by the head-up display device 100. The camera ECU 32 detects the coordinates of the right and left outer edges of one white line, however, it is sufficient in this embodiment when the coordinates of the start point S and the end point E of the white line 205 that can be captured by the camera 33 and is nearest to the front of the vehicle 8. In a case in which coordinates of the XYZ coordinate system are set as illustrated in FIG. 5, the start point S has coordinates S(x, y, z) with a smallest z-coordinate value in one detected white line 205, and the end point E has coordinates E(x, y, z) with a largest z-coordinate value in the same one detected white line 205.

For one white line 205, one point on the inner edge where a change occurs from the road surface to the white line 205, and another point on the outer edge where a change occurs from the white line 205 to the road surface, are determined. Hence, an average of these two points is used as the x-coordinate value, the y-coordinate value, and the z-coordinate value when determining the coordinates the start point S and the end point E of the white line 205.

The coordinates of the start point S and the end point E of the white line 205 may be computed by the camera ECU 32, or may be computed by the image projection device 21. In the latter case, the image projection device 21 may compute the coordinates of the start point S and the end point E of the white line 205 from the coordinates of the outer edges of the white line 205 computed by the camera ECU 32.

<Computing Coordinates on Road Surface>

Figure 6:
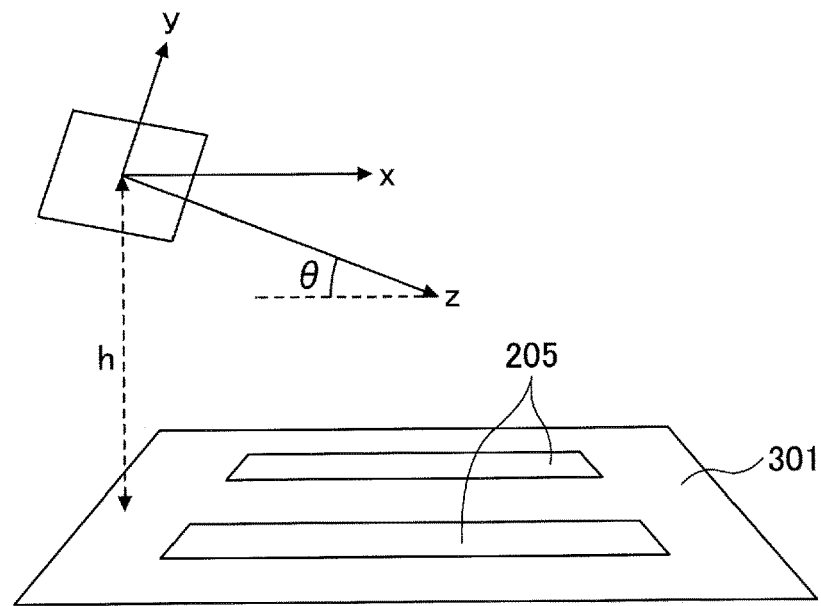
FIG. 6 is a diagram for explaining an example of a camera coordinate system.

The position of the white line 205 is detected from the image data as described above. However, in order to display the AR support image as if the AR support image is famed on the road surface, using the position of the white line 205 as the reference, the coordinates of the white line 205 in the camera coordinate system are required. A method of computing the coordinates of the white line 205 in the camera coordinate system, which has its origin at the center of the imaging device (or the camera lens) of the camera 33, will be described hereunder. It is assumed in this embodiment that the road surface is planar surface. FIG. 6 is a diagram for explaining an example of the camera coordinate system.

The planar surface in the camera coordinate system may be represented by the following formula (1).

$$\alpha x + \beta y + \gamma z = -h \quad (1)$$

In the formula (1), x, y, and z denote coordinate values of the point on a road surface 301. In addition, α, β, and γ denote coefficients that are determined by an inclination angle θ of the camera 33, and h denotes a height of the camera 33 from the road surface 301. As is well known, the coefficients α, β, and γ are x, y, and z elements of a normal vector with respect to the road surface 301. In a case in which the inclination angle θ of the camera 33 is zero, the normal vector with respect to the road surface 301 can be easily obtained. The normal vector with respect to the road surface 301 in the camera coordinate system can be computed by tilting (or rotating) the normal vector by the inclination angle θ with respect to a center that is the X-axis, thereby enabling the coefficients α, β, and γ to be obtained.

Next, the following formula (2) may be obtained by normalizing the xy coordinates of the image data using the distance z.

$$x_n = x/z, \; y_n = y/z \quad (2)$$

The following formula (3) may be obtained by substituting the formula (2) into the formula (1).

$$\begin{pmatrix} x \\ y \\ z \end{pmatrix} = \frac{1}{\alpha x_n + \beta y_n + \gamma} \begin{pmatrix} h x_n \\ h y_n \\ h \end{pmatrix} \quad (3)$$

The formula (3) obtains the white line coordinates in the camera coordinate system, from the white line position of the normalized image data. Accordingly, it is possible to obtain the three-dimensional coordinates of the white line 205 on the road surface 301. Details of deriving the formula (3) are described in Junshiro Kanda et al., "A method to measure road white line by analyzing images accumulated from video camera which is mounted on the vehicle", Information Processing Society of Japan (IPSJ), Mar. 7, 2006, for example.

<Transformation from Camera Coordinate System into Vehicle Coordinate System>

The three-dimensional coordinates of the white line 205 obtained by the formula (3) are in the camera coordinate system, while the image projection device 21 transforms the projection image into the AR support image in the vehicle coordinate system. For this reason, the white line coordinates in the camera coordinate system are transformed into the white line coordinates in the vehicle coordinate system.

Figure 7:
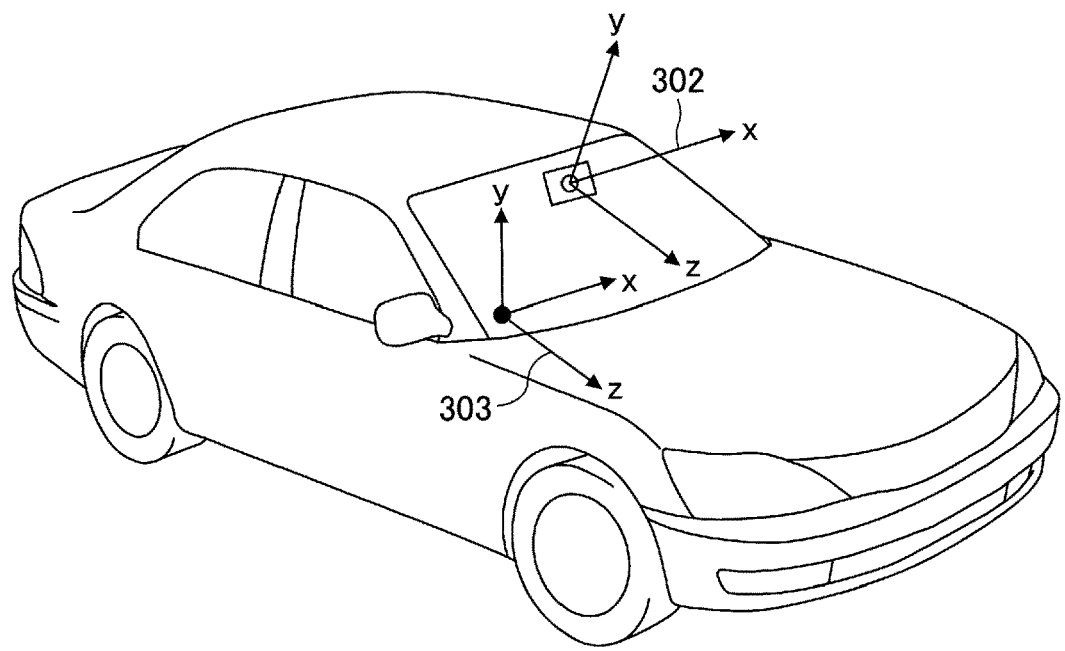
FIG. 7 is a diagram for explaining an example of a transformation from the camera coordinate system into a vehicle coordinate system.

FIG. 7 is a diagram for explaining an example of the transformation from a camera coordinate system 302 into a vehicle coordinate system 303. The vehicle coordinate system 303 may be set arbitrarily. For the sake of convenience, the vehicle coordinate system 303 in this embodiment is set so that the origin of the vehicle coordinate system 303 is the center (or center of gravity) of the vehicle 8. The origin of the camera coordinate system 302 is the center of the imaging device (or camera lens) of the camera 33. Accordingly, a translation in each of the x-direction, y-direction, and z-direction can be obtained by measurement.

In addition, because the inclination angle θ of the camera 33, that is, the camera coordinate system 302, is measured, the white line coordinates in the camera coordinate system 302 need only be rotated by this inclination angle ƒ for the transformation into the vehicle coordinate system.

<Display Example of AR Support Images Regarding White Lines as Structures>

Figure 8:
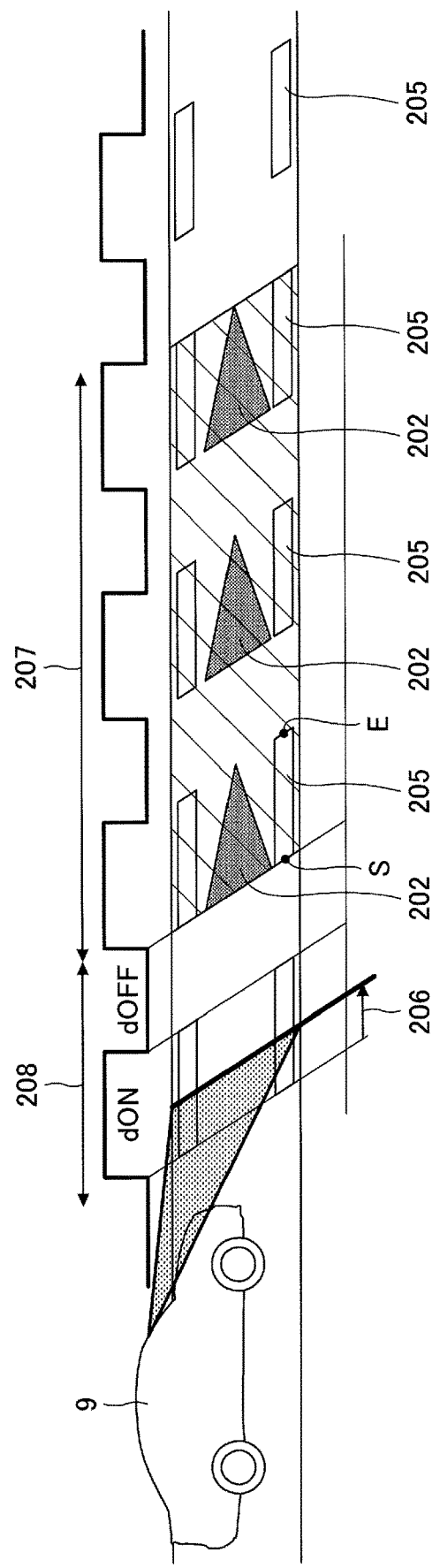
FIG. 8 is a diagram for explaining an example of the AR support image that is displayed according to a detected while line.

FIG. 8 is a diagram for explaining an example of the AR support image that is displayed according to a detected while line. The camera ECU 32 outputs the white line coordinates included in the capturing range, to the head-up display device 100. The image projection device 21 determines the display position of the AR support image, such as the triangular icon 202, based on the coordinates of the white line 205 that can be captured by the camera 33 and is nearest to the front of the vehicle 8.

In FIG. 8, dON denotes a length of one white line 205 from the start point S to the end point E of this one white line 205, and dOFF denotes a length of the interval between two successive white lines 205 in the traveling direction of the vehicle 8. That is, dOFF denotes the length of the interval from the end point E of the one white line 205 to the start point S of the white line 205 next to the one white line 205 along the traveling direction of the vehicle 8. As illustrated in FIG. 5, the length dON is the difference between the z-coordinates of the start point S and the end point E of the one white line 205. On the other hand, the length dOFF is the difference between the z-coordinates of the end point E of the one white line 205 and the start point S of the white line 205 next to the one white line 205 along the traveling direction of the vehicle 8. An offset 206 refers to a distance from the start point S of the white line 205 to an arbitrary point on the same white line 205.

The length dON is constant for ordinary roads or highways, and the length dOFF is also constant for the ordinary roads or the highways. Hence, as long as the camera ECU 32 can measure the length dON of one white line 205 that can be captured by the camera 33 and is nearest to the front of the vehicle 8, and the length dOFF of the interval to the next white line 205 along the traveling direction of the vehicle 8, it is possible to estimate the lengths dON and dOFF of other white lines 205 farther ahead of the vehicle 8 than these two white lines 205. A sensing zone 208 refers to a combination of the length dON of the white line 205 that can be captured by the camera 33 and is nearest to the front of the vehicle 8, and the length dOFF of the interval to the next white line 205 along the traveling direction of the vehicle 8.

Accordingly, when the length dON of one white line 205 that can be captured by the camera 33 and is nearest to the front of the vehicle 8, and the length dOFF of the interval to the next white line 205 along the traveling direction of the vehicle 8, are measured, the image projection device 21 can display the AR support image according to the start point S or the end point E of the white lines 205 farther ahead of the vehicle 8 than the one white line 205. In the example illustrated in FIG. 8, the AR support images of the triangular icons 202 are displayed according to the start points S of the three consecutive white lines 205 next to the white line 205 that can be captured by the camera 33 and is nearest to the front of the vehicle 8.

The number of white lines 205 farther ahead of the vehicle 8 than the one white line 205 that can be captured by the camera 33 and is nearest to the front of the vehicle 8, to which the AR support images are superimposed, is determined in advance. A HUD display zone 207 refers to a range of the white lines 205 to which the AR support images are superimposed. The HUD display zone 207 is a range in which the combiner 25 and the actual view are superimposed, for example. The HUD display zone 207 can be made larger than the capturing range. Hence, the head-up display device 100 in this embodiment can display the AR support images, superimposed on the white lines 205 farther ahead of the vehicle 8 than the one white line 205 that can be captured by the camera 33 and is nearest to the front of the vehicle 8, within the sensing zone 208 in a part of the capturing range, by utilizing the fact that the white lines 205 are formed at the constant intervals.

Figure 9:
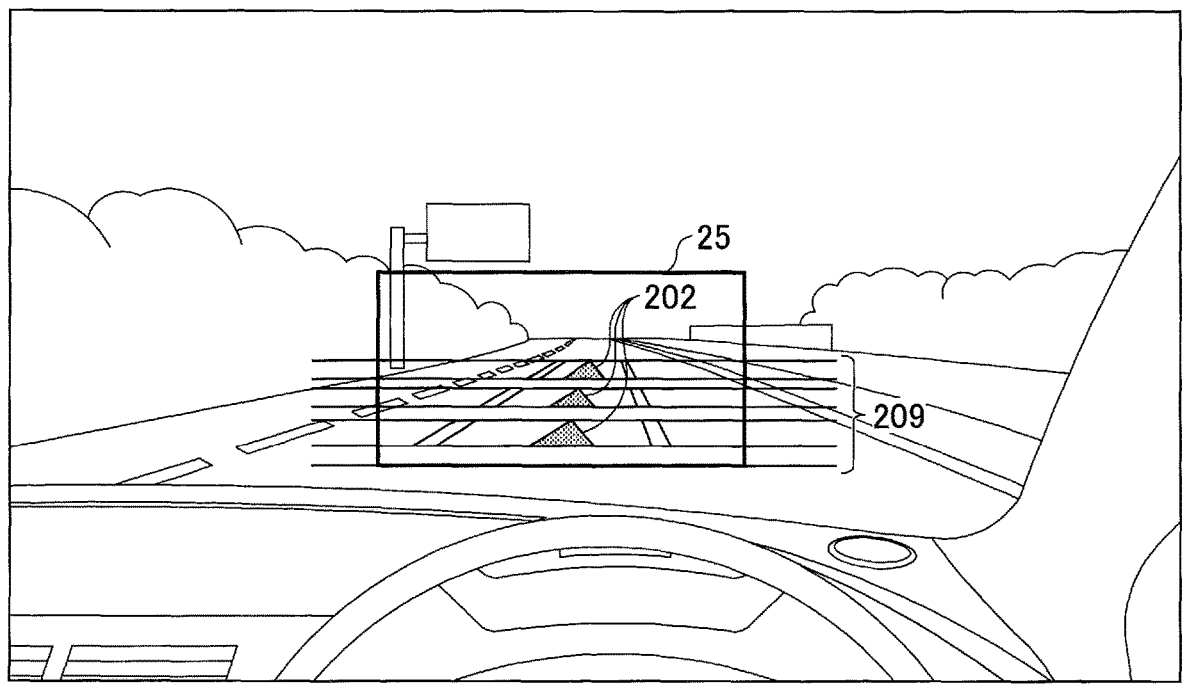
FIG. 9 is a diagram illustrating an example of the AR support image of triangular icons viewed from a driver.

FIG. 9 is a diagram illustrating an example of the AR support image of triangular icons 202 viewed from the driver 9. Because the start points of the AR support images match the start points S of the white lines 205, it is possible to reduce unnatural feeling perceived by the driver 9 with respect to the flow of the actual view. Horizontal lines 209 are illustrated in FIG. 9 for the sake of convenience to indicate the start point and the end point of the white lines 205. These horizontal lines 209 are not actually displayed by the head-up display device 100.

<Creating AR Support Image>

Figure 10A:
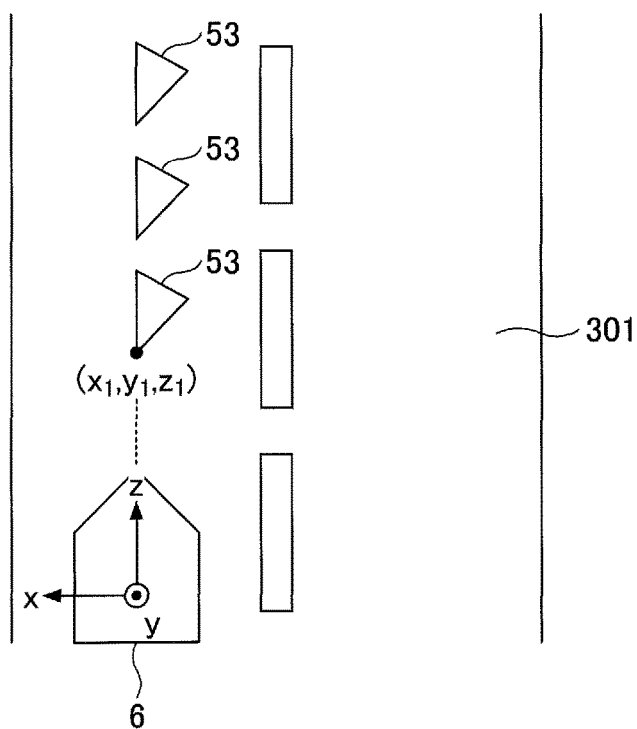
FIG. 10A and FIG. 10B are diagrams for explaining an example of creating the AR support images.
Figure 10B:
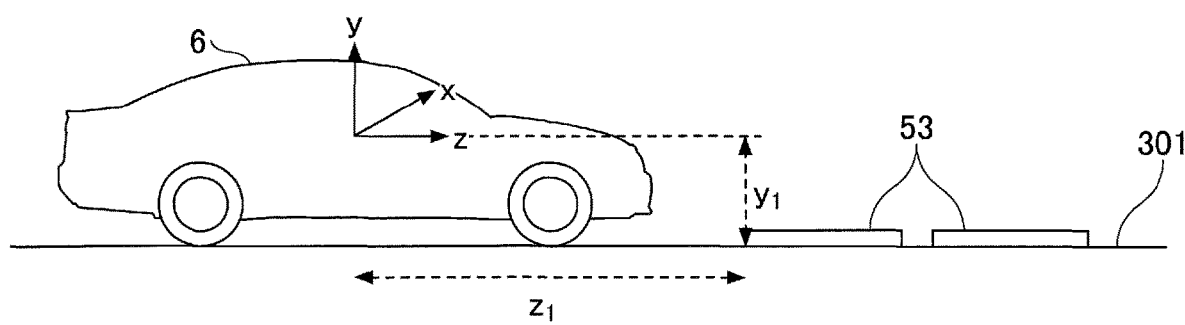

FIG. 10A and FIG. 10B are diagrams for explaining an example of creating the AR support images. FIG. 10A is an anticipated view for a case in which projection images 53 that are converted into the AR support images are formed (or painted) on the road surface 301. When it is assumed for the sake of convenience that the projection images 53 are actually painted on the road surface 301, the farther away the triangular shapes pointing right (projection image providing lane change guidance) are from the front of the vehicle 8 along the traveling direction of the vehicle 8, the smaller the triangular shapes would appear when viewed from the driver 9. For example, a width direction of the vehicle 8 (hereinafter also referred to as "a vehicle width direction") is taken along the x-axis, a vertical direction is taken along the y-axis, and the traveling direction of the vehicle 8 is taken along the z-axis. In addition, one vertex of the triangular shape is denoted by coordinates $(x_1, y_1, z_1)$.

FIG. 10B is an anticipated side view of the projection images 53 that are formed (or painted) on the road surface 301, and the vehicle 8, for the case illustrated in FIG. 10A. When a predetermined origin, such as the center of the vehicle 8, for example, that moves together with the vehicle 8, is determined, a height $y_1$ from the road surface 301 to the origin becomes known. In addition, the projection image 53 of the lane change guidance are displayed at the start point S of the white line 205, located a distance $z_1$ away from the origin along the z-direction in the traveling direction of the vehicle 8. Hence, the distance $z_1$ can be computed from the white line coordinates. The position where the projection image 53 of the lane change guidance is displayed, located at a certain distance from the center of the vehicle 8 along the vehicle width direction, and is effective from a viewpoint of supporting driving (that is, supporting the driver 9), has been determined experimentally. It has been determined experimentally that displaying the projection image 53 at the center between the white lines 205 on the right and left, or at the position directly in front of the vehicle 8 is effective from the viewpoint of supporting the driving. In the case in which the projection image 53 is displayed at the center between the white lines 205 on the right and left, the projection image 53 is always displayed at the center between the white lines 205 even when the vehicle 8 moves within the lane between the white lines 205, and the projection image 53 appears to the driver 9 as if the projection image 53 were painted on the road surface 301. In the case in which the projection image 53 is displayed at the position directly in front of the vehicle 8, the projection image 53 is always displayed at the position directly in front of the vehicle 8 even when the vehicle 8 moves within the lane between the white lines 205 on the right and left, and the projection image 53 is easily visually recognizable by the driver 9. Accordingly, the position where the projection image 53 is displayed, located a distance $x_1$ away along the vehicle width direction (that is, x-direction), is a set value. Therefore, the coordinates $(x_1, y_1, z_1)$ may be known coordinate values.

Figure 11:
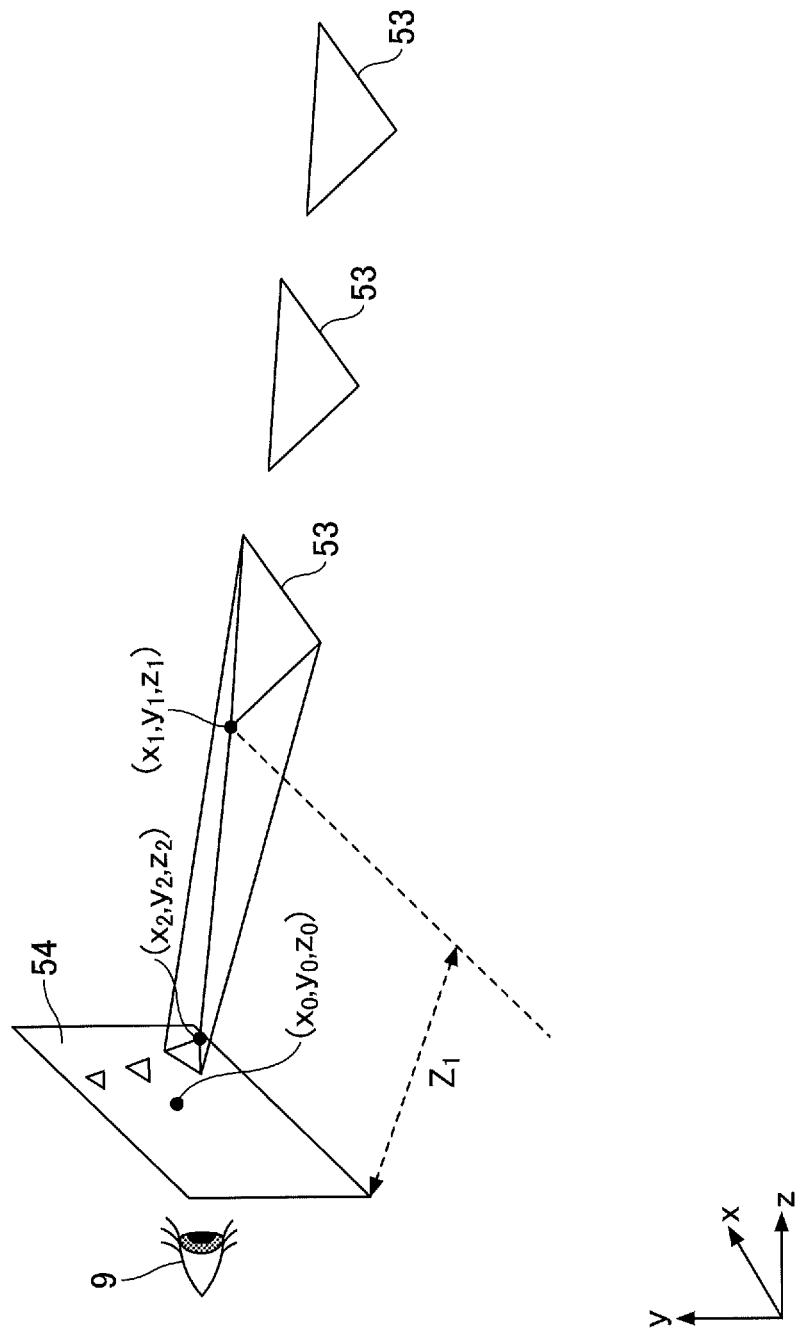
FIG. 11 is a diagram for explaining an example of a perspective projection transformation of projection images formed on a road surface to a projection plane.

FIG. 11 is a diagram for explaining an example of a perspective projection transformation of the projection images 53 formed on the road surface 301 to a projection plane 54. The image projection device 21 performs the perspective projection transformation of the projection images 53, and the projection plane 54 needs to be set in order to perform the perspective projection transformation. The projection plane 54 is a two-dimensional plane onto which the projection images 53 are projected. The projection plane 54 represents the visual range of the driver 9. When the head-up display device 100 displays the AR support image, the driver 9 views in front of the vehicle 8 through the combiner 25. Hence, an approximately vertical plane in a vicinity of the combiner 25 is set as the projection plane 54. Depending on where the projection plane 54 is set, center coordinates $(x_0, y_0, z_0)$ of the projection plane 54 are computed in the XYZ coordinate system described above. A size of the projection plane 54 is approximately determined from a size or the like of the combiner 25.

The image projection device 21 performs the perspective projection transformation with respect to the projection plane 54 described above. Hence, the projection image 53 is transformed into the AR support image that is viewed by the driver 9. In a case in which the combiner 25 is formed in front of a passenger set besides the driver's seat, the projection image 53 may be transformed into the AR support image that is viewed by a passenger instead of the AR support image that is viewed by the driver 9. By setting the projection plane 54, it is possible to transform the projection image 53 into the AR support image that is viewed from a predetermined direction.

When the coordinates of the projection image 53 projected to the projection plane 54 is noted by $(x_2, y_2, z_2)$, the perspective projection transformation in a homogeneous coordinate system may be represented by the following formula (4).

$$(x_2, y_2, z_2, 1) = (x_1, y_1, z_1, 1) \begin{pmatrix} z_0 & 0 & 0 & 0 \\ 0 & z_0 & 0 & 0 \\ -x_0 & -y_0 & 1 & -1 \\ 0 & 0 & 0 & z_0 \end{pmatrix} \quad (4)$$

The image projection device 21 can create the AR support image by performing the perspective projection transformation for each pixel of the projection image 53. The coordinates on the projection plate 54 can be obtained by dividing $x_2, y_2$ by a fourth component of the left term in the formula (4) above.

<Operation Procedure>

Figure 12:
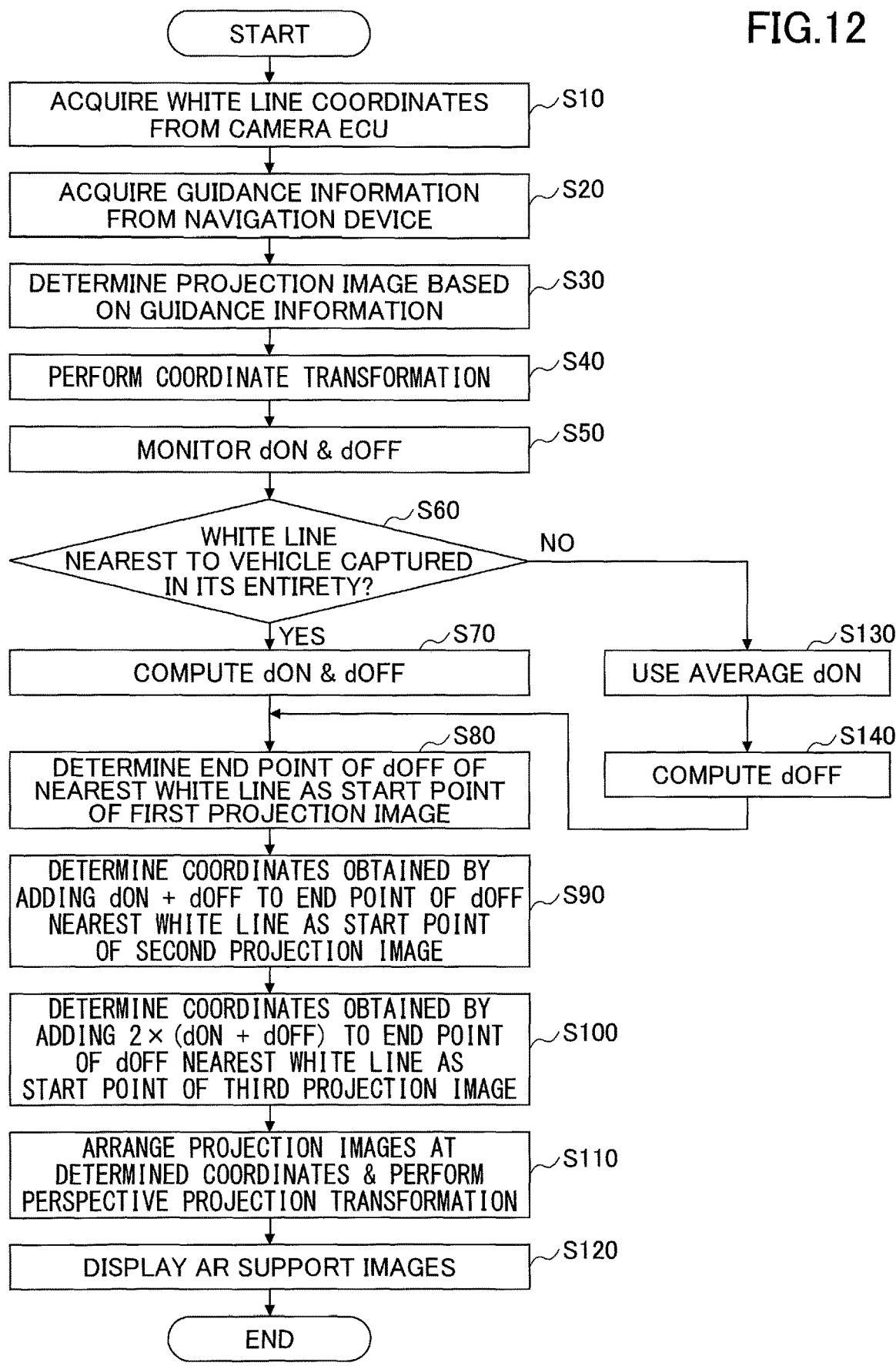
FIG. 12 is a flow chart illustrating an example of an operation procedure of the head-up display device.

FIG. 12 is a flow chart illustrating an example of an operation procedure of the head-up display device 100. The process illustrated in FIG. 12 is executed for one image data at a time.

First, the camera information IF 35 acquires the white line coordinates from the camera ECU 32 (step S10). Similarly, the navigation information IF 34 acquires the guidance information from the navigation device 31 (step S20). For example, it is assumed for the sake of convenience that the guidance information that is acquired is the lane change guidance that guides a change to the traffic lane on the right side. The lane change guidance that guides the change to the traffic lane on the right side guides the driver 9 to change the traffic lane on which the vehicle 8 is currently traveling to the traffic lane on the right side of the traffic lane on which the vehicle 8 is currently traveling. In a case in which the camera ECU 32 detects an obstacle, for example, the projection images 53 are generated from the image recognition result and not from the guidance information, and thus, the guidance information is not required in this case.

The projection image generator 36 generates the projection images 53 according to the guidance information (step S30). The projection images 53 of the triangular icons 202 are generated with respect to the guidance information that is the lane change guidance guiding the change to the traffic lane on the right side.

The coordinate transformation part 37 transforms the white line coordinates in the camera coordinate system into the coordinates in the vehicle coordinate system (step S40).

Next, the image position determination part 38 monitors the lengths dON and dOFF based on the white line coordinates (step S50). Monitoring of the lengths dON and dOFF includes confirming that the white lines 205 are stably detected, and obtaining an average of the length dON from the image data of several frames before in a case in which the white lines 205 are detected. The average of the length dON is used in a case in which the white line 205 that is nearest to the front of the vehicle 8 is not captured in its entirety. The monitoring is repeatedly performed with respect to the image data of several frames before.

The image position determination part 38 judges whether the white line 205 that is nearest to the front of the vehicle 8 is captured in its entirety (step S60). In other words, the image position determination part 38 judges whether white line 205 is visible in its entirety at the lower end part of the image data. For example, this judgment may be made by judging whether the coordinates of the start point S of the white line 205 matches the lowermost part of the image data.

When the judgment result in step S60 is Yes, the image position determination part 38 computes the lengths dON and dOFF (step S70). By updating the lengths dON and dOFF at the white line 205 that is most recently detected, it becomes easier to match the start point S of the white line 205 in the actual view to the start point of the AR support image.

Next, the image position determination part 38 determines the end point of the length dOFF following the white line 205 that is nearest to the front of the vehicle 8, as the start point of the first projection image 53 (step S80). In other words, because the lengths dON and dOFF are computed in the sensing zone 208 illustrated in FIG. 8, the image position determination part 38 determines the start point S of the white line 205 that appears first in the HUD display zone 207.

In addition, the image position determination part 38 determines the coordinates obtained by adding the lengths dON and dOFF (that is, dON+dOFF) to the end point of the length dOFF following the white line 205 that is nearest to the front of the vehicle 8, as the start point of the second projection image 53 (step S90). In other words, the position of the second projection image is determined according to the white line 205 that appears second in the HUD display zone 207.

Further, the image position determination part 38 determines the coordinates obtained by adding the lengths dON and dOFF twice (that is, 2×(dON+dOFF)) to the end point of the length dOFF following the white line 205 that is nearest to the front of the vehicle 8, as the start point of the third projection image 53 (step S100). In other words, the position of the third projection image is determined according to the white line 205 that appears third in the HUD display zone 207.

Accordingly, the AR support images can be displayed to match the start points S of the three white lines 205 that are captured in their entirety, based on the white line coordinates of the white line 205 that is nearest to the front of the vehicle 8 and is not captured in its entirety. In a case in which a large number of white lines 205, up to the distant white lines 205, are included in the capturing range of the camera 33, the positions of the projection images can be determined directly from all of the white line coordinates in the capturing range. However, in a case in which the camera 33 is mounted at a low position such as at the front bumper of the vehicle 8 or the like, for example, it may be difficult to include a large number of white lines 205 in the capturing range. Even in such a case, the head-up display device 100 in this embodiment can display the AR support images according to the distance white lines 205, by measuring the white line coordinates of the white line 205 that is nearest to the front of the vehicle 8.

Next, the image modifying part 39 arranges the projection images at the coordinates that are determined as described above, and performs the perspective projection transformation (step S110). Then, the image projection part 40 displays the projection images (step S120).

On the other hand, when the judgment result in step S60 is No, the image position determination part 38 uses the average of the length dON that is obtained by the monitoring (step S130). In addition, the image position determination part 38 measures the length dOFF (step S140). Thereafter, the processes of steps S80 through S120 are executed. In the case in which the white line 205 that is nearest to the front of the vehicle 8 is not captured in its entirety, it is of course possible to utilize the white line 205 that is next nearest to the front of the vehicle 8 and is captured in its entirety.

In the example described above, the AR support images are displayed with respect to the three white lines 205 that are more distant from the front of the vehicle 8, compared to the white line 205 that is nearest to the front of the vehicle 8 and is not captured in its entirety. However, the AR support images may be displayed with respect to four or more shite lines that are more distant from the front of the vehicle 8, compared to the white line 205 that is nearest to the front of the vehicle 8 and is not captured in its entirety. In addition, it is possible to measure not only the lengths dON and dOFF of the white line 205 that is nearest to the front of the vehicle 8, but also the lengths dON and dOFF of all of the white lines 205 in the capturing range. Moreover, it is possible to measure the lengths dON and dOFF of a predetermined number of white lines 205 in the capturing range, from the white line 205 that is nearest to the front of the vehicle 8, and compute averages of the measured lengths dON and dOFF.

The image projection device 21 updates the AR support images with respect to the three white lines 205 that are more distant from the front of the vehicle 8, for every image data in which the white line 205 is detected. Hence, it is possible to always display accurate AR support images based on the actual lengths dON and dOFF of the white lines 205 painted on the road surface 301. In addition, because the AR support images are displayed according to the white lines 205, the AR support images move towards the rear of the vehicle 8 at the same speed as the white lines 205 as the vehicle 8 travels frontwards. Further, because the intervals (or pitch) at which the AR support images are displayed matches the constant intervals (or pitch) at which the structures, such as the white lines 205, appear, it is possible to reduce unnatural feeling perceived by the driver 9 with respect to the flow of the actual view, and to reduce the possibility of the driver 9 experiencing VR sickness.

<Other Display Examples Using Structures Appearing at Constant Intervals>

FIG. 13A, FIG. 13B, and FIG. 13C are diagrams for explaining other display examples using structures appearing at constant intervals.

In the example illustrated in FIG. 13A, the end point E of the white line 205 matches the end point of the AR support image of the triangular icon 202 that is the lane change guidance. Effects similar to the above are also obtainable in this example.

In the example illustrated in FIG. 13B, the end point E of the white line 205 matches the start point of the AR support image of the triangular icon 202 that is the lane change guidance. Effects similar to the above are also obtainable in this example.

In the example illustrated in FIG. 13C, the AR support image of the triangular icon 202 that is the lane change guidance is displayed at the center between the start point S and the end point E of the white line 205. In other words, the AR support image is displayed between two white lines 205 that are adjacent along the road-width direction, at the center along the traveling direction of the vehicle 8. The center of the AR support image matches the center between the start point S and the end point E of the white line 205. Effects similar to the above are also obtainable in this example.

Of course, the AR support image may be displayed at an arbitrary position relative to the white line 205. In other words, the AR support image may be displayed at a position that is offset by a predetermined distance from the start point S of the white line 205, along the traveling direction of the vehicle 8.

In FIG. 13A, FIG. 13B, and FIG. 13C, only one VR support image is arranged with respect to one white line 205. However, a plurality of VR support images may be arranged with respect to one white line 205. In this latter case, the start point of the first AR support image preferably matches the start point S of the one white line 205, and the end point of the last AR support image preferably matches the end point E of the one white line 205.

FIG. 14A, FIG. 14B, and FIG. 14C are diagrams illustrating display examples for a case in which a plurality of AR support images are displayed with respect to one white line.

In the example illustrated in FIG. 14A, three AR images of the triangular icons 202 are displayed with respect to one white line 205. The start point of the first AR support image matches the start point S of the one white line 205, and the end point of the third AR support image matches the end point E of the one AR support image. The display illustrated in FIG. 14A may be made according to a procedure described later in conjunction with FIG. 15.

AR support images other than the triangular icons 202 may be displayed in a similar manner. In the example illustrated in FIG. 14B, five AR support images of the lane departure warning, formed by circular icons 204, are displayed according to the one white line 205. The circular icons 204 of the lane departure warning are arranged on the inner side of the one white line 205, and extend parallel to the one white line 205 along the direction of the one white line 205. The lane departure warning warns the driver 9 when there is a possibility that the vehicle 8 will deviate from the lane by crossing the one white line 205. For example, the lane departure warning is generated when the center of the vehicle 8 deviates from the center along the road-width direction between the right and left white lines 205 by a threshold value or greater. The display illustrated in FIG. 14B may also be made according to the procedure described later in conjunction with FIG. 15.

In the example illustrated in FIG. 14C, three AR support images of the lane departure warning, formed by the circular icons 204, are displayed so as to supplement the interval between the white lines 205 along the traveling direction of the vehicle 8. The circular icons 204 of the lane departure warning are arranged to supplement the length dOFF of the interval where no white line 205 exists, so as to warn the driver 9 and reduce the possibility of the vehicle 8 crossing between the white lines 205 separated by the interval along the traveling direction of the vehicle 8.

FIG. 15 is a flow chart illustrating an example of the procedure in which the image projection device 21 displays the plurality of AR support images with respect to one white line 205.

First, the image position determination part 38 computes a quotient P and a remainder Q, by dividing the length dON of the white line 205 by a length D of one AR support image (step S1).

The image position determination part 38 computes a difference, by subtracting 1 from the quotient P, in order to provide the interval between the AR support images (step S2). The difference is the number of AR support images that are displayed with respect to one white line 205. Of course, in a case in which the intervals of the AR support images are to be set larger, for example, the difference may be computed by subtracting an integer greater than or equal to 2 from the quotient P.

The image position determination part 38 computes a difference value V, by subtracting a product of the number of AR support images (for example, three) with respect to one white line 205 and the length D of one AR support image, from the length dON of the white line 205 (step S3).

The image position determination part 38 computes an interval W between two successive AR support images along the traveling direction of the vehicle 8, by dividing the difference value V by a value that is obtained by subtracting 1 from the number of AR support images (step S4).

The image position determination part 38 determines the start point S of the white line 205, as the start point of the first AR support image (step S5).

The image position determination part 38 determines a value that is obtained by adding the length D of the AR support image and the interval W to the start point S of the white line 205, as the start point of the second AR support image (step S6).

The image position determination part 38 determines a value that is obtained by adding two times the length D of the AR support image (that is, 2D) and two times the interval W (that is, 2W) to the start point S of the white line 205, as the start point of the third AR support image (step S7).

By determining the positions of the AR support images in the manner described above, it is possible to match the start point of the first AR support image and the start point of the white line 205, and also match the end point of the last AR support image and the end point E of the white line 205.

When arranging the plurality of AR support images in the interval between the white lines 205 along the traveling direction of the vehicle 8, having the length dOFF, such as in the example illustrated in FIG. 14C, the positions of the AR support images may be determined by a procedure similar to the procedure illustrated in FIG. 15.

Figure 16A:
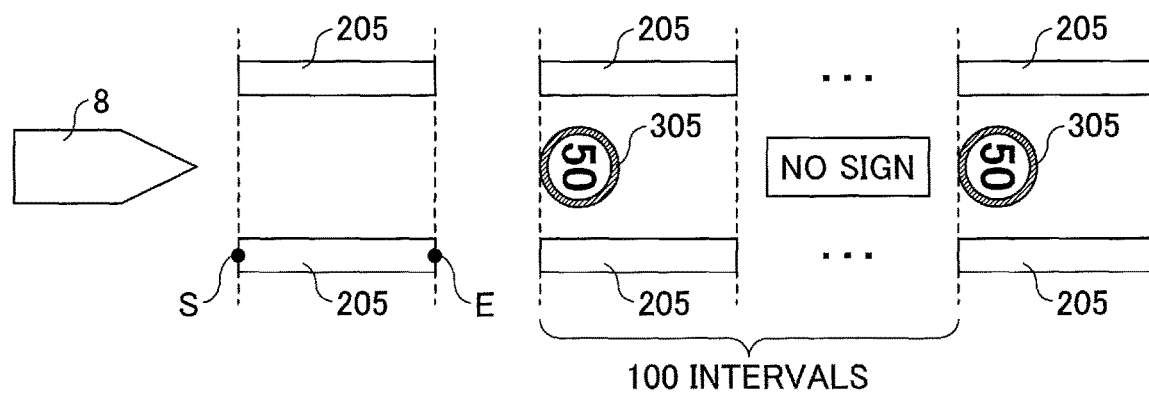
FIG. 16A and FIG. 16B are diagrams illustrating an example of the AR support image of a road sign icon displayed according to the white line.
Figure 16B:
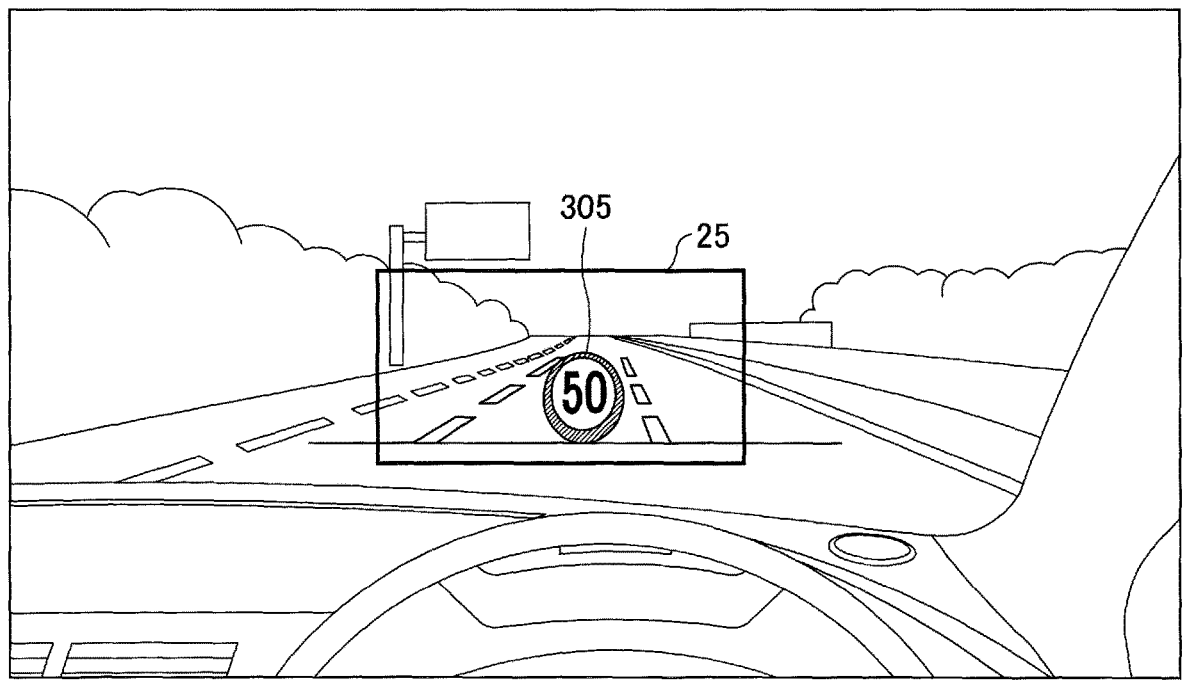

FIG. 16A and FIG. 16B are diagrams illustrating an example of the AR support image of a road sign icon 305 displayed according to the white line 205. It is confusing to the driver 9 when the road sign 305 is displayed according to each white line 205. Hence, the head-up display device 100 in this embodiment displays the AR support image of the road sign icon 305 for every predetermined number of white lines 205. FIG. 16A illustrates the example in which the AR support image of the road sign icon 305 is displayed for every 100 white lines 205 (that is, at a pitch of 100 white lines 205). Of course, the AR support image of the road sign icon 305 may be displayed for every several tens of white lines 205, for example.

FIG. 16B illustrates the example of the AR support image of the road sign icon 305 that is displayed and superimposed on the actual view visible from the driver 9. As illustrated in FIG. 16A and FIG. 16B, because the road sign icon 305 is displayed according to the start point S of the white line 205, it is possible to reduce the unnatural feeling perceived by the driver 9 with respect to the flow of the actual view, and to reduce the possibility of the driver 9 experiencing the VR sickness.

The display illustrated in FIG. 16A and FIG. 16B can be made by displaying the next road sign icon 305 every time 100 white lines 205 are counted from the time when the image projection part 40 (for example, the image position determination part 38) projects the road sign icon 305.

The road sign icon 305 illustrated in FIG. 16A and FIG. 16B indicates a speed limit of 50 km/h, for example, however, other road signs may be displayed in a similar manner. Examples of the other road signs include a horn zone (or use horn) sign, a minimum speed limit sign, a climbing lane (or slow traffic) sign, or the like. In a case in which the road sign is identified by an image recognition function of the camera ECU 32, the camera ECU 32 may recognize the numbers or characters from the road sign by a character recognition function. The camera ECU 32 may also recognize the road sign by a pattern matching function. Various road signs may be displayed in a similar manner as long as the road sign is identifiable by the character recognition function, the pattern matching function, or the like. In addition, the information related to the road sign may be detected by the image recognition function of the camera ECU 32, or acquired by road-to-vehicle communication. In such cases, the AR support image of the road sign may be displayed using arbitrary structures as references.

The display illustrated in FIG. 16A and FIG. 16B is not limited to the road sign, and is applicable to information related to an arbitrary road, or information that supports driving of the vehicle 8. For example, various signs or boards, digital signages (or electronic display boards) indicating "traffic accident (ahead)", "road narrows (ahead)", or the like may be displayed according to the white line 205. In addition, information acquired from VICS (registered trademark, Vehicle Information and Communication System) may be displayed according to the white line 205. Further, information acquired from the navigation device 31, such as "xxx meters to destination", or the like may be displayed according to the white line 205.

<Structures, Other than White Lines, Repeatedly Appearing at Constant Intervals>

The structures, other than the white lines, repeatedly appearing at constant intervals, include guard rails, distance marking plates, or the like, for example. The guardrails have various designs, and are arranged at constant intervals by support beams, for example. Reflectors may be arranged at constant intervals on the guardrails. Hence, if the camera ECU 32 is capable of detecting the structures such as the guard rails, the distance marking plates, or the like, the head-up display device 100 can display the AR support images similarly to the white lines 205, according to the structures.

Figure 17:
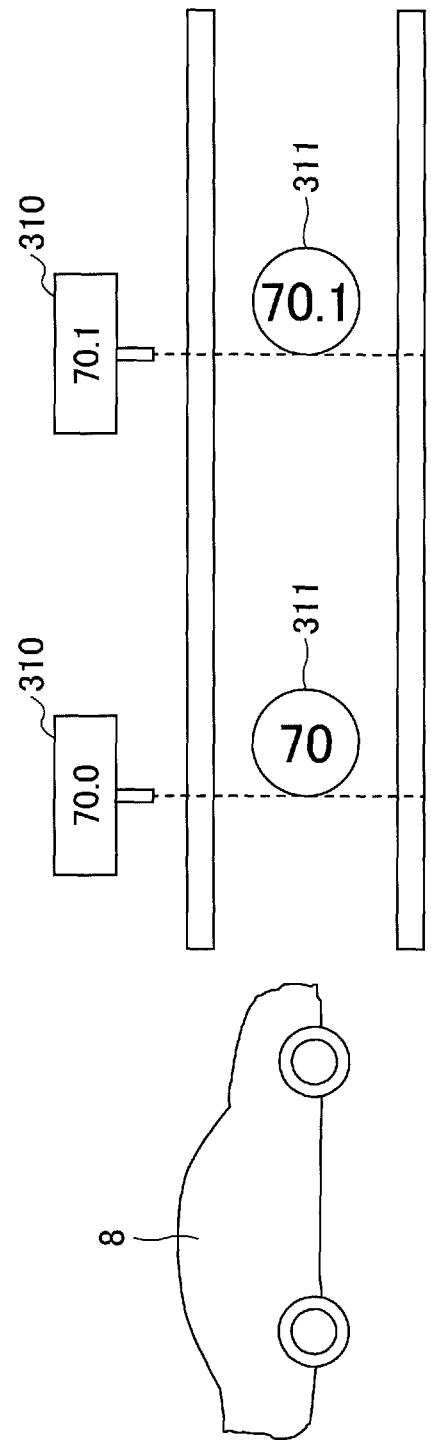
FIG. 17 is a diagram illustrating an example of the AR support image of distance marking plate icons displayed according to distance marking plates.

FIG. 17 is a diagram illustrating an example of the AR support images of distance marking plate icons 311 displayed according to distance marking plates 310. The distance marking plate 310 indicates the distance from a certain origin. The distance indicated by the distance marking plate 310 is sometimes also referred to as a road address (or address) of the road. Although it depends on the zone, the distance marking plates 310 are provided at constant intervals of 100 meters, for example. FIG. 17 illustrates the example in which the distance marking plates 310 indicating "70" km and "70.1" km are provided. In addition, the distance marking plate icons 311 of these distance marking plates 310 indicate distance values "70" km and "70.1" km, respectively.

The display illustrated in FIG. 17 may be performed by steps S511 through S513 described hereunder.

The camera ECU 32 recognizes the distance marking plate 310 by the image recognition function, and outputs distance information obtained by the character recognition function to the image projection device 21 (step S511).

The image projection device 21 generates the AR support image at the distance obtained by adding 100 meters to the distance information (step S512). 100 meters are added to the distance information, so that the image projection device 21 generates the AR support image at the distance of 100 meters. In addition, "100 meters" is the difference between the distance information acquired from two consecutive signs located along the traveling direction of the vehicle 8.

The image projection device 21 displays the AR support image that is generated, at the distance of 100 meters ahead of the distance marking plate 310 along the traveling direction of the vehicle 8 (step S513).

Accordingly, even in the case of the structures such as the distance marking plates 310 that indicate numerical values (that is, distance information) that change for each distance marking plate 310, it is possible to match the numerical value indicated by the structure and the numerical value of the AR support image, and display the AR support image according to the structure. In other words, it is possible to match the distance information indicated by the distance marking plate 310 and the distance information of the AR support image and display the AR support image according to the distance marking plate 310.

As the vehicle 8 travels frontwards in the traveling direction, the distance from the vehicle 8 to the distance marking plate icon 311 becomes shorter. Hence, the image projection device 21 may detect the distance traveled by the vehicle 8 from vehicle velocity pulses that indicate the velocity of the vehicle 8 and are obtained by known techniques. The image projection device 21 may update the display position of the distance marking plate icon 311 towards the front of the vehicle 8 by the distance traveled by the vehicle 8. Alternatively, the image projection device 21 may detect the distance traveled by the vehicle 8 from the position of the vehicle 8 detected by the GNSS.

<Conclusion>

As described heretofore, the head-up display device 100 in this embodiment can display the AR support images that have the sense of unity between the actual view and the AR support images, by utilizing the structures that repeatedly appear at the constant intervals. When the driver 9 visually recognizes the AR support images together with the structures on the road, such as the white lines 205, that are in the visual range of the driver 9, the AR support images and the structures on the road will have aligned positional relationships, identical flow rates, and synchronized flows. Hence, all of the causes conventionally encountered, namely, the AR support images and the structures on the road having the misaligned positional relationships, the different flow rates, and the non-synchronized flows, which may cause the driver 9 to experience the VR sickness, can be eliminated by this embodiment. For this reason, it is possible to reduce the unnatural feeling perceived by the driver 9 with respect to the flow of the actual view, and to reduce the possibility of the driver 9 experiencing the VR sickness.

Second Embodiment

In the first embodiment described above, the head-up display device 100 displays the AR support images according to the structures that repeatedly appear at the constant intervals. On the other hand, the head-up display device 100 in a second embodiment displays the AR support images according to an object having distinctive features (hereinafter also referred to as "a distinctive object").

<Display Examples of AR Support Images>

Figure 18A:
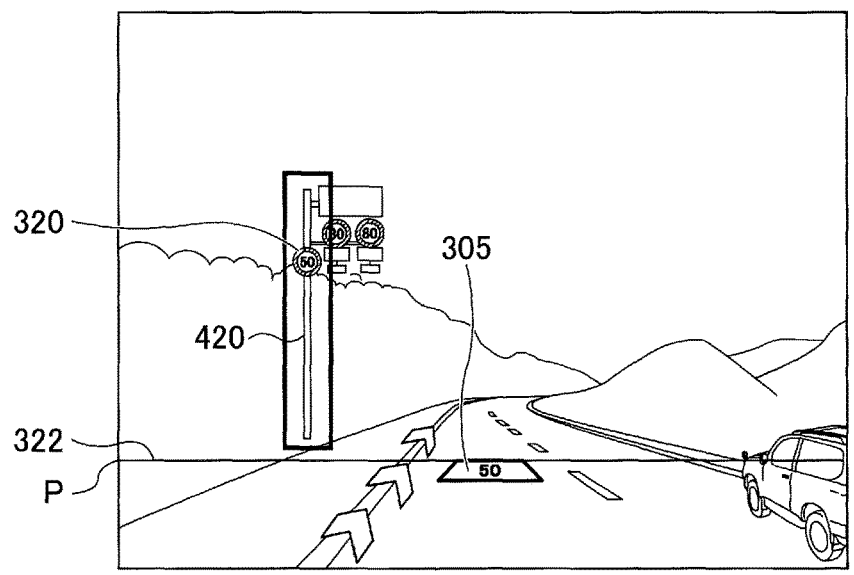
FIG. 18A, FIG. 18B, and FIG. 18C are diagrams illustrating examples of the AR support images in a second embodiment viewed from the driver.
Figure 18B:
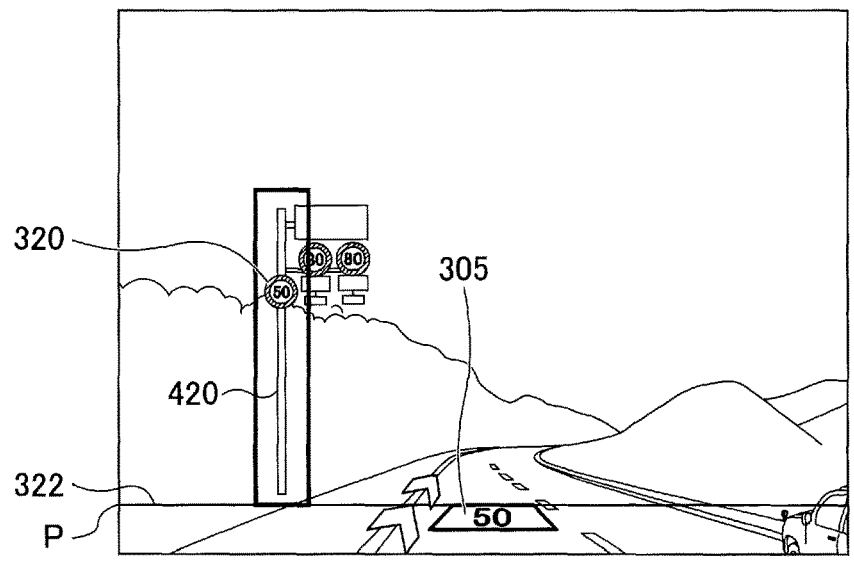
Figure 18C:
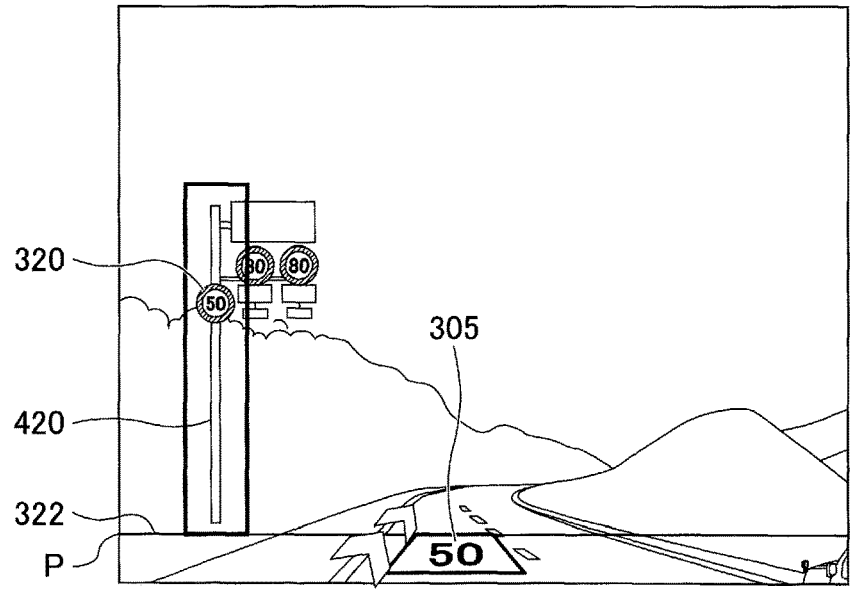

FIG. 18A, FIG. 18B, and FIG. 18C are diagrams illustrating examples of the AR support images in the second embodiment viewed from the driver 9. FIG. 18A, FIG. 18B, and FIG. 18C illustrate changes in the AR support images as the vehicle 8 gradually approaches the distinctive object.

FIG. 18A illustrates a road sign 320 indicating the speed limits, that is detected as the distinctive object. The head-up display device 100 in this embodiment displays the AR support image using, as a reference, a position P on the road surface level of the distinctive object. Accordingly, the head-up display device 100 first recognizes the road sign 320. In the case of the road sign 320, an intersection of a support beam 420 of the road sign 320 and the road surface 301 is the position P on the road surface level. A straight line 322, horizontally traversing the road from the position P on the road surface level of the road sign 320, is illustrated in each of FIG. 18A, FIG. 18B, and FIG. 18C for the sake of convenience. This straight line 322 is not actually displayed. The road sign icon 305 is displayed in front of the vehicle 8 or at the center of the traffic lane on which the vehicle 8 is traveling, at the position P on the road surface level of the road sign 320.

The information indicated by the road sign icon 305 illustrated in FIG. 18A, FIG. 18B, and FIG. 18C is the same as the information indicated by the road sign icon 305 of the first embodiment described above. However, in this embodiment, the road sign icon 305 is displayed according to the distinctive object, and not according to the white line 205 as in the case of the first embodiment. In a case in which the speed limit is "50 km/h", for example, an image (or icon) including the numerical value "50" becomes the AR support image.

In FIG. 18B and FIG. 18C, the method of displaying the AR support image of the road sign icon 305 is the same as that of FIG. 18A. Hence, in FIG. 18B and FIG. 18C, the road sign icon 305 is displayed at the position P on the road surface level of the road sign 320. When the AR support image is generated, the size of the projection image subjected to the perspective projection transformation is constant. In other words, the size of the projection image 53 before being transformed into the AR support image illustrated in FIG. 18A, FIG. 18B, and FIG. 18C by the perspective projection transformation is constant. However, as the vehicle 8 approaches the projection image, the road sign icon 305 gradually becomes larger.

In order to display the AR support image using the road sign 320 as the reference, the camera 33 is preferably capable of acquiring the distance information. Hence, the camera 33 is preferably a stereo camera, or a monocular camera capable of acquiring the distance information, such as MOBILEYE (registered trademark), a camera utilizing defocusing caused by a color filter, or the like. The distance information may be acquired using laser or LIDAR (Light Detection And Ranging). The distance from the vehicle 8 to the road sign 320 can be obtained from the distance information that is acquired as described above. Because a height of the road surface 301 is either known or is measurable by the camera 33, the AR support image can be displayed at the position P on the road surface level of the road sign 320, as illustrated in FIG. 18A, FIG. 18B, and FIG. 18C.

<Operation Procedure>

FIG. 19 is a flow chart for explaining an example of an operation procedure of the head-up display device 100 when the head-up display device 100 displays the AR support image. The process illustrated in FIG. 19 is repeated for every image data.

First, the camera information IF 35 acquires the information of the distinctive object from the camera ECU 32 (step S310). The information of the distinctive object includes a type of the distinctive object, contents of the distinctive object, coordinates of the distinctive object, or the like. For example, the information of the distinctive object in this example indicates that the type of the distinctive object is the road sign 320, the contents of the distinctive object indicate the speed limit of 50 km/h, and the coordinates of the distinctive object indicates the coordinates of the road sign 320 (that is, the board part) in the camera coordinate system.

Next, the projection image generator 36 generates the projection images 53 based on the information of the distinctive object (step S320). For example, the projection image generator 36 judges that the distinctive object is the road sign 320, based on the information of the distinctive object, and generates the projection images 53 according to the road sign 320. In a case in which the road sign 320 includes the speed limit, the projection images 53 that are generated include the numerical value indicating the speed limit.

The coordinate transformation part 37 transforms the coordinates of the road sign 320 in the camera coordinate system into the coordinates of the road sign 320 in the vehicle coordinate system (step S330).

The image position determination part 38 determines the position of the projection image 53 using the coordinates of the road sign 320 in the vehicle coordinate system (step S340). For example, the x-coordinate of the position of the projection image 53 is the center between two white lines 205 that are adjacent along the road-width direction, or is directly in front of the vehicle 8, the y-coordinate of the position of the projection image 53 is the same height as the road surface 301, and the z-coordinate of the position of the projection image 53 is the distance from the vehicle 8 to the road sign 320.

The image modifying part 39 arranges the projection image 53 at the coordinates of the position that is determined by the image position determination part 38, and performs the perspective projection transformation to generate the AR support image (step S350).

The image projection part 40 displays the AR support image that is obtained by transforming the projection image 53 (step S360).

As the vehicle 8 travels frontwards in the traveling direction, the distance from the vehicle 8 to the road sign 320 becomes shorter. The road sign icon 305 approaches the vehicle 8 at a velocity that is the same as the velocity of the vehicle 8 traveling frontwards. Hence, when viewed from the driver 9, the road sign icon 305 on the road surface 301 gradually approaches the vehicle 8 and gradually appears larger, together with the road sign 320. For this reason, the driver 9 can positively and visually recognize the road sign 320 indicating the speed limit or the like, and reduce a situation in which the driver 9 fails to notice the road sign 320.

The display method employed in this embodiment is similarly applicable to any distinctive object that is generally recognizable on the road. On the highways, for example, the AR support images may be displayed using, as the references, signs or boards indicating an exit, directions to various destinations, distances to rest areas (or parking areas), traffic jam information, distance to tollgate, emergency parking area, emergency telephone, distance markers, or the like. In addition, on ordinary roads, for example, the AR support images may be displayed using, as the references, a stop line at an intersection, a traffic light, various kinds of road signs, a pedestrian crossing, or the like.

<Conclusion>

As described heretofore, the head-up display device 100 in this embodiment can display the AR support images using the distinctive objects on the road as the references. Hence, the driver 9 can visually recognize the AR support image at the position on the same road surface 301 as the distinctive object. For this reason, it is possible to reduce the unnatural feeling perceived by the driver 9 with respect to the flow of the actual view, and to reduce the possibility of the driver 9 failing to notice valuable or important information provided by the distinctive object.

<Other Applications>

The embodiments of the present invention are described above. However, the present invention is not limited to the embodiments described above, and various variations, modifications, and substitutions may be made without departing from the scope of the present invention.

For example, the camera ECU 32 detects the white line coordinates in the embodiments, however, the image projection device 21 may compute the white line coordinates from the image data.

In addition, the projection image is arranged on the road surface 301 and transformed into the AR support image in the embodiments. However, the projection image may be arranged above or below the road surface 301, so as to emphasize the AR support image or to make the AR support image less conspicuous.

Moreover, although the embodiments describe the white lines, guiderails, distance marking plates, or the like as examples of the structures that repeatedly appear at the constant intervals, other structures may be used. Examples of the other structures that repeatedly appear at the constant intervals include bumps, rumble strips, road studs, or the like. The bumps on the paved road may warn the driver 9 to reduce the speed of the vehicle 8, for example, by generating noise or vibration. The rumble trips are undulations formed on the road surface to warn the driver 9 that the vehicle 8 is crossing the traffic lane, for example, by generating noise or vibration. The road studs are metal studs embedded at the road surface 301, and may include lamps or reflectors. The road studs may improve visibility of centerlines, median strips, merger strips, curves, lane dividers, or the like of the driver 9.

Further, the virtual image may be projected in a space in front of the vehicle 8 using the structures as the references, regardless of the road surface 301. In addition, the AR support image may be displayed outside the road, as long as the display is made using the structures as the references. For example, the AR support image may be displayed on the curbstones, on an outer side of the curbstones, on the lane divider, on the guardrail, or the like. The AR support image may be superimposed on the white lines. The AR support image may also be superimposed on the outer side of the white lines.

The AR support images may have various shapes. Hence, the shapes of the AR support images are not limited to the triangular and circular shapes described in the embodiments.

The white lines are linear in the described embodiments. However, the white lines may be curved. In other words, the AR support image may be projected, using the white lines or the like as the references, even while the vehicle 8 travels along a curved road.

The head-up display device 100 does not necessarily have to be embedded within the instrument panel of the vehicle 8. For example, the head-up display device 100 may be arranged on the instrument panel. Alternatively, the head-up display device 100 may be arranged on the ceiling of the vehicle 8, or on a sun visor of the vehicle 8, for example. The head-up display device 100 may be detachably mounted on the vehicle 8.

The head-up display device 100 is mounted on the vehicle 8 in the embodiments described above. However, the head-up display device 100 may be mounted on a movable body other than the vehicle 8. Examples of the movable body includes aircrafts, trains, ships, motorcycles, bicycles, wheelchairs, or the like.

The camera information IF 35 may form an example of an information acquisition part, and the projection image generator 36 may form an example of an image generator. The image projection part 40 may form an example of a projection part.

According to the embodiments described above, it is possible to provide a head-up display device, a navigation device, a display method, and a computer-readable storage medium, which can display an image according to structures in an actual view.

Although the embodiments are numbered with, for example, "first," or "second," the ordinal numbers do not imply priorities of the embodiments.

What is claimed is:

1. A head-up display device that displays a virtual image in front of a vehicle, comprising:
a memory configured to store a program; and
a processor configured to execute the program and perform a process including:
acquiring information related to a target object recognized from image data received from an imaging device that captures an actual view in front of the vehicle;
generating a projection image to be projected as the virtual image;
determining a display position of the projection image along a traveling direction of the vehicle, based on the information related to the target object, using the target object as a reference;
transforming the projection image into a support image viewed from a predetermined direction; and
projecting the support image in front of the vehicle,
wherein the determining updates the display position of the projection image every time the acquiring acquires the image data from the imaging device, so that a speed at which a display content, corresponding to the target object within the support image, moves within the support image and approaches the vehicle within the support image, is controlled to match a speed at which the target object in the actual view moves and approaches the vehicle in the actual view.

2. The head-up display device as claimed in claim 1, wherein the determining determines the display position of the projection image to a position of the target object on a road surface, obtained from a position of the target object.

3. The head-up display device as claimed in claim 1, wherein the information related to the target object includes a position of the target object on a road surface, and the determining matches a start point of the target object along the traveling direction of the vehicle to a start point of the projection image, or matches an end point of the target object along the traveling direction of the vehicle to the start point of the projection image.

4. The head-up display device as claimed in claim 1, wherein the determining matches the end point of the target object along the traveling direction of the vehicle to an end point of the projection image.

5. The head-up display device as claimed in claim 1, wherein the determining arranges a start point and an end point of the target object along the traveling direction of the vehicle to positions between a start point and an end point of the projection image.

6. The head-up display device as claimed in claim 1, wherein a plurality of target objects are repeatedly formed on a part of a road, the generating generates a plurality of projection images to be projected as virtual images, and the determining matches one of a start point and an end point of each of the plurality of target objects to a start point of a corresponding one of the plurality of projection images.

7. The head-up display device as claimed in claim 1, wherein a plurality of target objects are repeatedly formed on a part of a road, the generating generates a plurality of projection images to be projected as virtual images, and the determining matches the end point of each of the plurality of target objects to an end point of a corresponding one of the plurality of projection images.

8. The head-up display device as claimed in claim 1, wherein a length of the projection image is shorter than a length of the target object along the traveling direction of the vehicle, the determining determines display positions of a plurality of projection images using the target object as a reference, and the determining matches a start point of a first projection image among the plurality of projection images to a start point of the target object, and matches an end point of a last projection image among the plurality of projection images to an end point of the target object.

9. The head-up display device as claimed in claim 1, wherein a plurality of target objects are repeatedly arranged at constant intervals, and the determining includes computing a length of each of the plurality of target objects and intervals of the plurality of target objects, using a position of one target object closest to the vehicle along the traveling direction of the vehicle and included in the information related to the target object, and estimating positions of target objects more distant from the vehicle than the one target object closest to the vehicle based on the length each of the plurality of target objects and the intervals of the plurality of target objects that are computed, to determine display positions of the plurality of projection images using the estimated position of the one target object as the reference.

10. The head-up display device as claimed in claim 1, wherein a plurality of target objects are repeatedly formed on a part of a road at constant intervals, and the determining matches one of a start point and an end point of the target object along the traveling direction of the vehicle to a start position of the projection image, for every predetermined number of target objects.

11. The head-up display device as claimed in claim 1, wherein the target object is a sign or board on a road, and the generating generates the projection image including information that is indicated on the sign or board.

12. The head-up display device as claimed in claim 1, wherein the target object is one of a lane boundary line dividing traffic lanes, a distance marking plate, and a guardrail.

13. A navigation device comprising:

the head-up display device as claimed in claim 1; and a device configured to guide the vehicle mounted with the head-up display device to a destination.

14. The head-up display device as claimed in claim 1, wherein the target object is provided along a part of a road at constant intervals, and the target object is selected from a group consisting a sign or board on a road, a lane boundary line dividing traffic lanes, a distance marking plate, and a guardrail.

15. A display method of displaying a virtual image in front of a vehicle by a processor of a head-up display device, comprising:

acquiring, by the processor, information related to a target object recognized from image data received from an imaging device that captures an actual view in front of the vehicle;

generating, by the processor, a projection image to be projected as the virtual image;

determining, by the processor, a display position of the projection image along a traveling direction of the vehicle, based on the information related to the target object, using the target object as a reference;

transforming, by the processor, the projection image into a support image viewed from a predetermined direction; and projecting, by the processor, the support image in front of the vehicle, wherein the determining updates the display position of the projection image every time the acquiring acquires the image data from the imaging device, so that a speed at which a display content, corresponding to the target object within the support image, moves within the support image and approaches the vehicle within the support image, is controlled to match a speed at which the target object in the actual view moves and approaches the vehicle in the actual view.

16. The display method as claimed in claim 15, wherein the information related to the target object includes a position of the target object on a road surface, and the determining matches a start point of the target object along the traveling direction of the vehicle to a start point of the projection image, or matches an end point of the target object along the traveling direction of the vehicle to the start point of the projection image.

17. The display method as claimed in claim 15, wherein the determining matches the end point of the target object along the traveling direction of the vehicle to an end point of the projection image.

18. A non-transitory computer-readable storage medium having stored therein a program which, when executed by a computer, performs process to display a virtual image in front of a vehicle, including:

acquiring information related to a target object recognized from image data received from an imaging device that captures an actual view in front of the vehicle;

generating a projection image to be projected as the virtual image;

determining a display position of the projection image along a traveling direction of the vehicle, based on the information related to the target object, using the target object as a reference;

transforming the projection image into a support image viewed from a predetermined direction; and projecting the support image in front of the vehicle, wherein the determining updates the display position of the projection image every time the acquiring acquires the image data from the imaging device, so that a speed at which a display content, corresponding to the target object within the support image, moves within the support image and approaches the vehicle within the support image, is controlled to match a speed at which the target object in the actual view moves and approaches the vehicle in the actual view.

19. The non-transitory computer-readable storage medium as claimed in claim 18, wherein the information related to the target object includes a position of the target object on a road surface, and the determining matches a start point of the target object along the traveling direction of the vehicle to a start point of the projection image, or matches an end point of the target object along the traveling direction of the vehicle to the start point of the projection image.

20. The non-transitory computer-readable storage medium as claimed in claim 18, wherein the determining matches the end point of the target object along the traveling direction of the vehicle to an end point of the projection image.

* * * * *